United States Patent [19]
Fleek et al.

[11] Patent Number: 5,533,069
[45] Date of Patent: Jul. 2, 1996

[54] METHOD AND APPARATUS FOR DIGITAL FREQUENCY COMPENSATION OF CARRIER DRIFT IN A PSK DEMODULATOR

[75] Inventors: Arthur E. Fleek, Cary; William O. Camp, Jr., Chapel Hill, both of N.C.; Gary M. Warchocki, Owego, N.Y.; Michael J. Bracco, Raleigh, N.C.

[73] Assignee: International Business Machines Corporation, Armonk, N.Y.

[21] Appl. No.: 329,362

[22] Filed: Oct. 26, 1994

[51] Int. Cl.$^6$ ....................................... H04L 27/06
[52] U.S. Cl. .................. 375/344; 375/329; 375/360; 375/375
[58] Field of Search ...................... 375/279, 280, 375/281, 282, 283, 284, 326, 329, 330, 331, 332, 333, 371, 375, 324, 326, 344, 371; 329/304, 306, 345, 346

[56] References Cited

U.S. PATENT DOCUMENTS 4,707,666  11/1987  Pfeifer et al. ................. 375/324 X
5,272,448  12/1993  Hedstrom et al. ............. 375/324 X

*Primary Examiner*—Stephen Chin
*Assistant Examiner*—Kevin Kim
*Attorney, Agent, or Firm*—Stephen T. Keohane; John E. Hoel

[57] ABSTRACT

A carrier sensing circuit coupled to a receiving amplifier, measures the frequency of a phase shift modulated carrier signal by counting a predetermined number of the pulses for a measured interval whose duration is determined by counting a first clock count value. A demodulator coupled to the amplifier, detects when the spacing between the edges of the square wave pulses changes in response to the phase shift modulation. The demodulator measures first intervals between consecutive rising edges of the received signal, by counting clock pulses for a second selected interval whose duration is determined by a second selected count value. The demodulator further measures second intervals between consecutive falling edges of the received signal by counting clock pulses for a third selected interval whose duration is determined by a third selected count value. A compensating circuit coupled to the carrier sensing circuit and to the demodulator, compensates for frequency drift in the carrier signal or in the local oscillator by adjusting the second selected count value and the third selected count value, using the first clock count value.

8 Claims, 18 Drawing Sheets

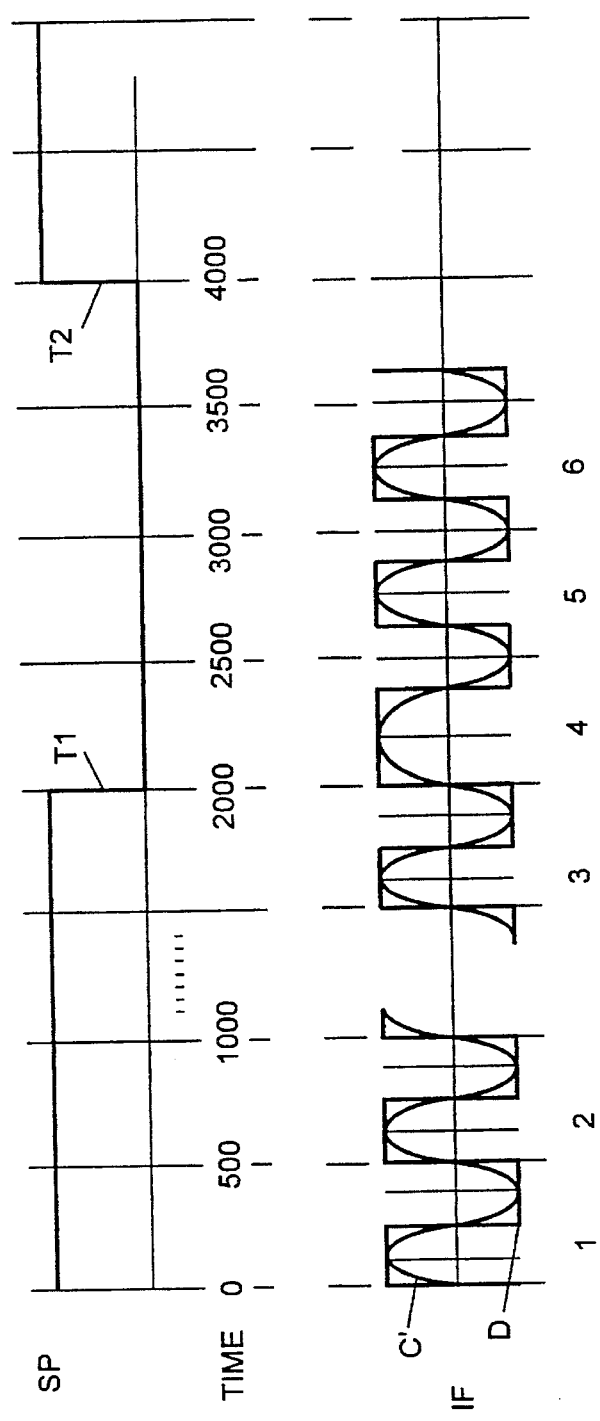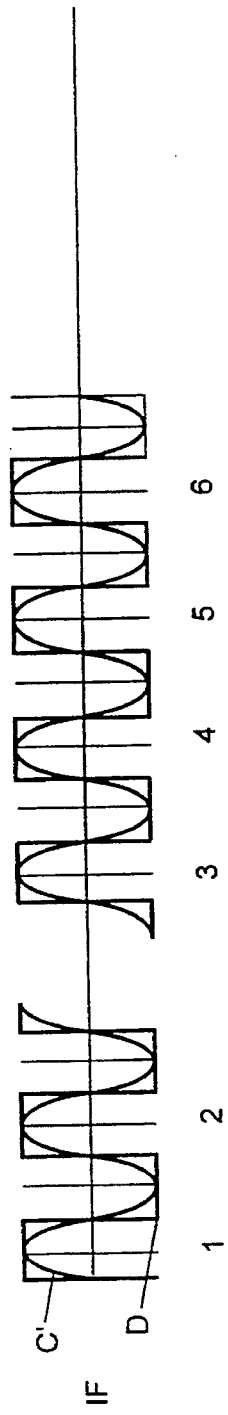

1

METHOD AND APPARATUS FOR DIGITAL FREQUENCY COMPENSATION OF CARRIER DRIFT IN A PSK DEMODULATOR

FIELD OF THE INVENTION

The invention disclosed broadly relates to data processing systems, and more particularly relates to digital input/output systems for communication over a radio medium.

BACKGROUND OF THE INVENTION

Phase shift key (PSK) modulation of radio signals has been used in the past to transmit digital information between data processing systems. One example is shown in U.S. Pat. No. 5,150,070, entitled "Demodulator for biphase, suppressed-carrier PSK signals" by P. Rinaldi. The phase modulation technique uses a 180 degree phase shift to distinguish between a binary one and a binary zero. This forces the carrier to be zeroed out during modulation. To demodulate the modulated signal, the prior art requires complex circuitry to reliably reconstitute the binary information at the receiver. The demodulators of the prior art must reconstruct the carrier. They require coherent demodulation to create a signal that is phase locked with the incoming signal, and they then must combine the two in a multiplier to detect the data. The IF signal must be made synchronous with the demodulated signal off the carrier. Stated otherwise, the carrier and the local oscillator must be made synchronous to demodulate the PSK signal in the prior art. What is needed in the prior art is a simple radio demodulation method and apparatus, that can detect phase changes in PSK modulated signals at very low intermediate frequencies.

In phase shift key modulation, a carrier signal, for example a 2.4 gHz carrier signal, is selectedly applied to a phase shift delay circuit, depending upon the binary state of control input to the delay circuit. For example, when there is a binary zero data state for the control input, no phase shift delay is applied to the carrier signal. Alternately, when there is a binary one data state, a phase shift delay is applied to the carrier signal. The carrier signal is then transmitted to the receiver. At the receiver, there is a local oscillator that oscillates at a slightly different frequency, for example 2.4 gHz plus 2 mHz. At the receiver, these two frequencies are mixed and a corresponding beat note signal or intermediate frequency (IF) signal is produced. Phase shift information which has been imposed on the carrier signal is then manifested in the IF signal at the receiver. A significant problem in such phase shift key modulation communication techniques is created by the drift in the frequency of the oscillator at the transmitter, which generates the 2.4 gHz carrier signal, and the drift of the local oscillator at the receiver, which generates the 2.4 gHz plus 2 mHz signal. The relative drift in the frequencies of these two oscillators will result in unstable characteristics in the intermediate frequency produced at the receiver and therefore unreliable detection of the binary data being transmitted.

OBJECTS OF THE INVENTION

It is an object of the invention to provide a wireless local area network that has a more reliable and accurate reception of digital transmissions from a sending node, than has been available in the prior art.

It is another object of the invention to provide a wireless local area network that has a better compensation for frequency drift in the carrier signal or the local oscillator, than has been available in the prior art.

SUMMARY OF THE INVENTION

These and other objects, features and advantages are accomplished by the invention disclosed herein. The invention provides an improved digital frequency compensation for drifting in the carrier frequency or the local oscillator frequency of a wireless local area network. The network includes a first computer at a sending node of the network, which originates the binary signal. A transmitter is coupled to the first computer at the sending node, for forming a phase shift modulated carrier signal from the binary signal, which is transmitted as a wireless radio signal.

A phase shift PSK modulator at the sending node, has an input connected to a source binary signal. It outputs a PSK modulated carrier signal that is delayed by a phase shift when the binary signal changes from a first to a second state, and that is undelayed when the binary signal changes from the second state to the first state. The modulated carrier signal is applied to a radio signal transmitting antenna and transmitted by radio transmission to the receiving node.

At the receiving node of the wireless local area network, a receiver applies the received radio signal to a limit amplifier, which forms square wave pulses having rising and falling edges separated by spacings.

In accordance with the invention, a carrier sensing circuit coupled to the amplifier, measures the frequency of the carrier signal by counting a predetermined number of the pulses for a measured interval whose duration is determined by counting a first clock count value.

A demodulator coupled to the amplifier, detects when the spacing between the edges of the square wave pulses changes in response to the phase shift modulation. The demodulator measures first intervals between consecutive rising edges of the received signal, by counting clock pulses for a second selected interval whose duration is determined by a second selected count value. The demodulator further measures second intervals between consecutive falling edges of the received signal by counting clock pulses for a third selected interval whose duration is determined by a third selected count value.

In accordance with the invention, a compensating circuit coupled to the carrier sensing circuit and to the demodulator, compensates for frequency drift in the carrier signal or in the local oscillator by adjusting the second selected count value and the third selected count value, using the first clock count value.

An additional feature of the invention is a frequency centering circuit which is coupled to the carrier sensing circuit and to the demodulator, for adjusting the measuring frequency for the clock pulses.

Then, the demodulator combines results of measuring first intervals and measuring second intervals to provide a composite representation of the binary signal at the receiver. A second computer coupled to the demodulator at the receiving node of the wireless digital network, processes the binary signal output from the demodulator.

In this manner, the wireless local area network has a more reliable and accurate reception of digital transmissions from the sending node.

DESCRIPTION OF THE FIGURES

These and other objects, features and advantages will be more fully appreciated with reference to the accompanying figures.

FIG. 15A is a waveform diagram of the intermediate frequency signal D which is modulated by the spoiler signal SP.

FIG. 15B is a waveform diagram of signal D for the intermediate frequency after the spoiler signal SP no longer modulates the carrier signal.

DISCUSSION OF THE PREFERRED EMBODIMENT

Figure 1A:
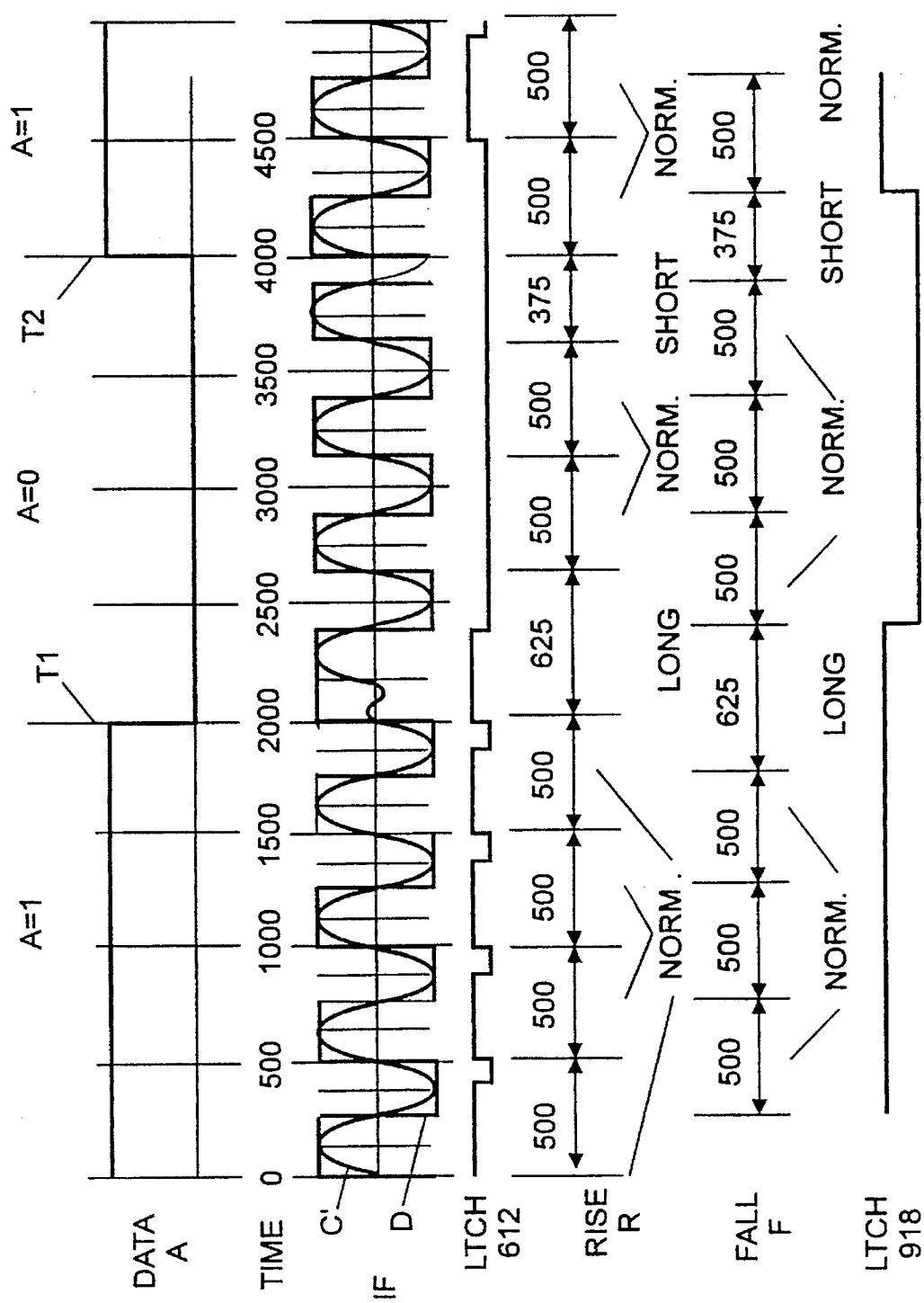
FIG. 1A is a waveform diagram of the intermediate frequency (IF) demodulation.

The waveform diagram of FIG. 1A illustrates a 0.5 megabit per second data rate waveform A showing a binary 1 A=1 interval which ends at the time T1 with a transition from a binary 1 to a binary 0 state. The time in nanoseconds is shown along the abscissa of the waveform and it is seen that at 2000 nanoseconds, the T1 event occurs. After time T1 and before time T2, the data waveform is in a binary 0 state A=0. At the instant T2, a transition from binary 0 to binary 1 occurs with A=1.

Figure 2:
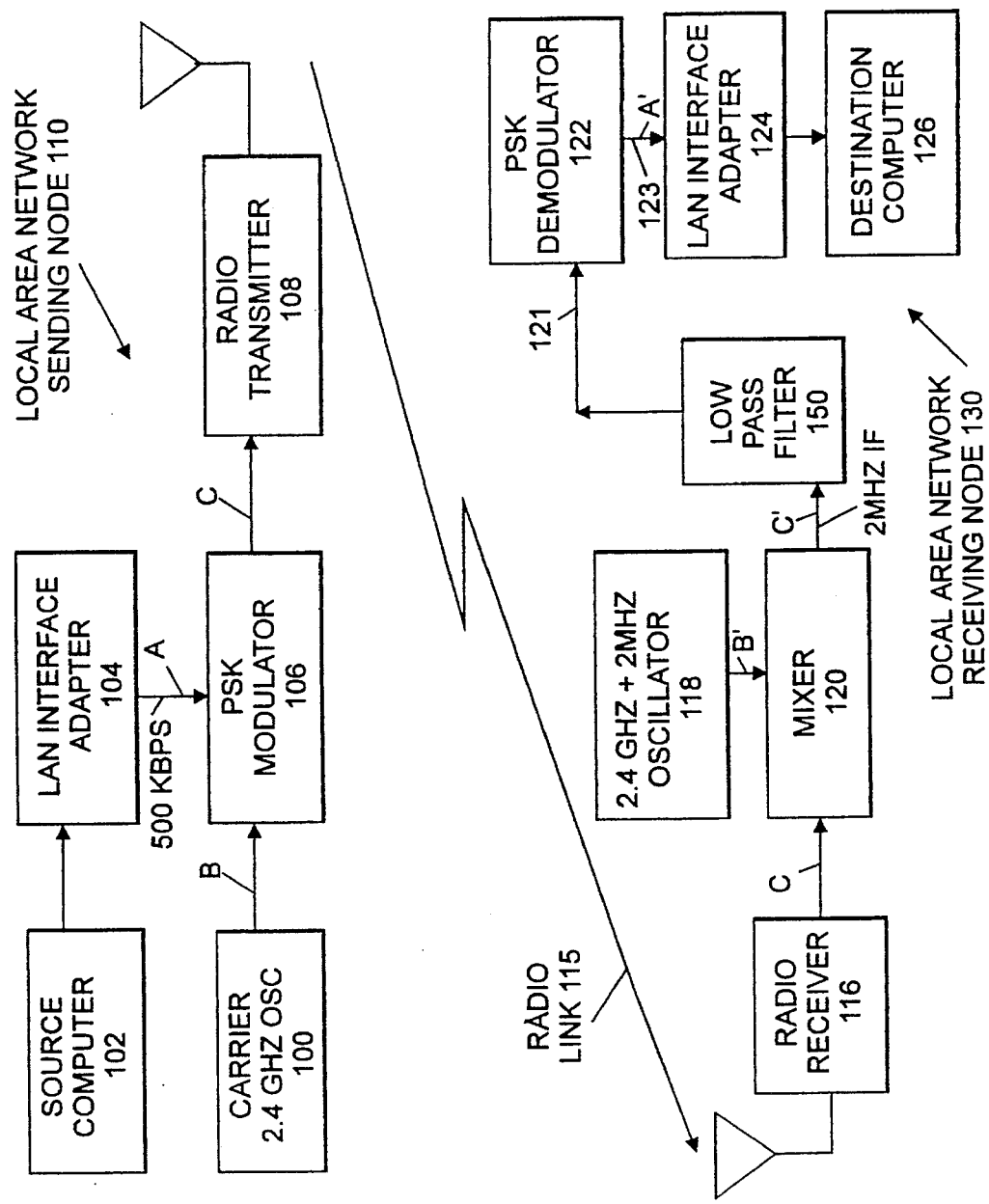
FIG. 2 is a functional block diagram of the local area network, including the sending node and the receiving node, in accordance with the invention.

Reference can be made to the system block diagram of FIG. 2 which illustrates how the transmitter at the local area network sending node 110 transmits the information in the data waveform A. A source computer 102 outputs binary digital information to the local area network interface adapter 104, which outputs a 500 Kbps binary data stream A. The data rate for the binary data stream A can have other values up to ½ of the IF frequency D in FIG. 1A. Thus, if the IF frequency is higher, for example at 20 mHz, then the data rate can have any value up to 10 megabits per second, for example. A 2.4 gHz oscillator 100 generates the carrier signal B. The carrier signal B is applied to the phase shift key (PSK) modulator 106. The control signal which is the binary signal A is applied to the modulator 106. Modulation occurs when the waveform A transitions from the binary A=1 to binary A=0 at the time T1; a phase shift delay is applied to the carrier signal B. Alternately, when the data waveform A transitions from a binary value A=0 to a binary value A=1 at time T2, the phase shift delay is removed from the carrier signal B. This modulated carrier signal is then applied as signal C to the radio transmitter 108 at the local area network sending node 110. An electromagnetic radio wave 115 is transmitted from the transmitter 108 to the radio receiver 116 at the local area network receiving node 130 in FIG. 2. The receiver 116 then outputs the waveform C to the input of the signal mixer 120. The local oscillator 118 at the receiving node 130, has a frequency of 2.4 gHz+2 mHz. The local oscillator at the receiving node could also have a frequency of 2.4 gHz−2 mHz, for example. The local oscillator signal B' is applied to the other input to the mixer 120, resulting in a heterodyned beat signal C' which is the 2 mHz intermediate frequency signal. The 2 mHz intermediate frequency signal at C' is applied to a low pass filter 150 whose output 121 is then applied to the PSK demodulator 122. The demodulator 122 is shown in greater detail in FIG. 3. The output of the demodulator 122 is a binary data stream A' which is the reconstructed data stream A which was applied to the input of the modulator 106 at the sending node 110. The output of the demodulator 122 on line 123 is applied to the local area network interface adapter 124 and then to the destination computer 126 at the local area network receiving node 130.

Figure 2A:
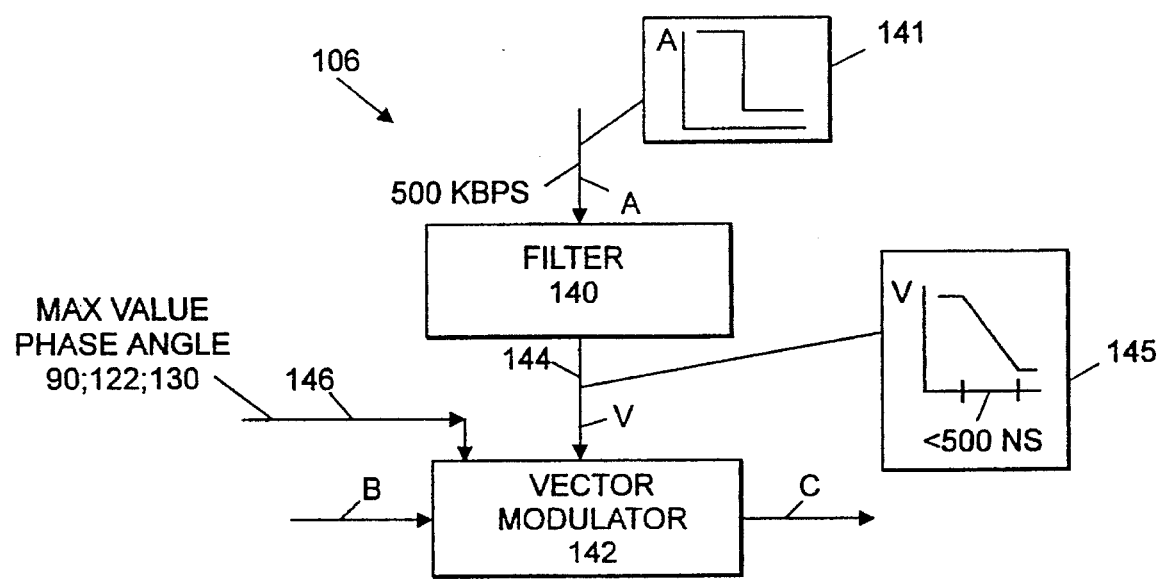
FIG. 2A shows the preferred embodiment of the modulator 106, which uses an adjustable phase shift value which is set at 122° phase shift.

FIG. 2A shows the preferred embodiment for the modulator 106, and the best mode of the invention, with the phase angle for the phase shift having a value of 122°, applied over an interval less than but approximately equal to the period of the intermediate frequency of 500 nanoseconds.

Figure 2B:
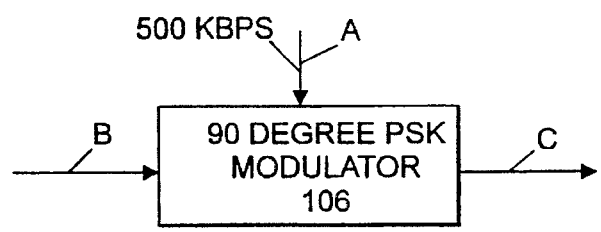
FIG. 2B shows an alternate embodiment of the modulator 106, with a fixed phase shift value of 90°.

FIG. 2B shows an alternate embodiment for the modulator 106, wherein a 90° phase shift is applied. When the binary signal A transitions from a binary value of one to a binary value of zero. Alternately when the data waveform A transitions from a binary value of zero to a binary value of one, the phase shift delay is removed from the carrier signal B. Inspection of the waveform diagram A in FIG. 1A will show that the transition from the binary one to the binary zero is substantially instantaneous. When a 90° phase shift is applied to the carrier signal B during an extremely small interval, undesirable harmonic frequencies are generated which make the design difficult to comply with the Federal Communications Commission Part 15 spectral requirements. Thus, the preferred embodiment and best mode of the invention is for the modulator 106 as shown in FIG. 2A.

In FIG. 2A, the modulator 106 is designed to apply the phase shift over a duration which is less than and approximately equal to the intermediate frequency period of 500 nanoseconds. In order to increase the detectability of the phase shift signal at the receiver, the magnitude of the phase shift angle was increased from 90° up to 130°. Phase shift magnitudes from 90° to 130° are found to work well. The best mode for the phase shift angle is found to be 122°. The modulator 106 of FIG. 2A accomplishes the phase modulation as follows. The binary signal A is applied to the input of the filter 140, which is a low pass filter. The filter 140 includes a notch filter at 0.75 mHz, to suppress undesirable harmonics. The output of the filter 140, is applied on line 144 to the input of the vector modulator 142. The wave form V for the output on line 144 from the filter 140, is shown in the waveform 145. It is seen in the waveform 145, that the duration over which the binary value of the signal A changes from a binary one to binary zero, is approximately 500 nanoseconds, which is the intermediate frequency. This is compared with the waveform 141 shown in FIG. 2A for the binary waveform A input to filter 140. The vector modulator 142 has an adjustable input 146 which allows the setting of the maximum value for the phase angle to be applied by the vector modulator 142 to the carrier signal B. Settings for the maximum value phase angle 146 can be fixed from 90° to 130° and a satisfactory modulated carrier signal C can be obtained. In the best mode of the invention, the setting for the maximum value phase angle 146 is found to be a value of 122 degrees.

Figure 1B:
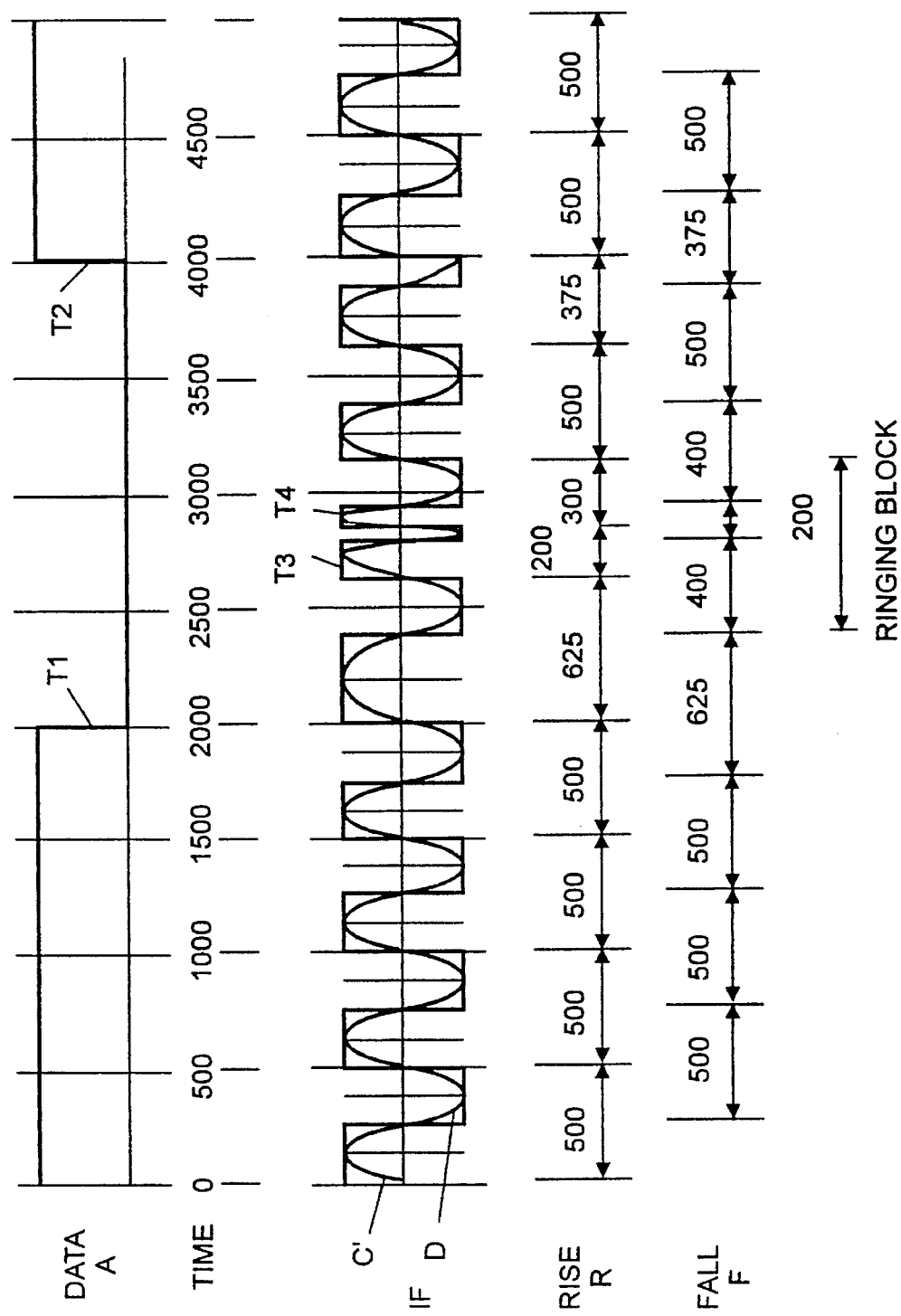
FIG. 1B is a waveform diagram illustrating the digital filtering in the demodulator of the invention.

Returning to FIG. 1A, it can be seen that the intermediate frequency signal C' output from the mixer 120 in FIG. 2 is an approximately 2 mHz sinewave signal whose phase is modulated by the 500 Kbps digital signal A. The modulation shown for FIGS. 1A and 1B is instantaneous 90° phase shift when the binary data A transitions from a binary one to a binary zero. This is done to simplify the illustration of the invention.

Figure 3:
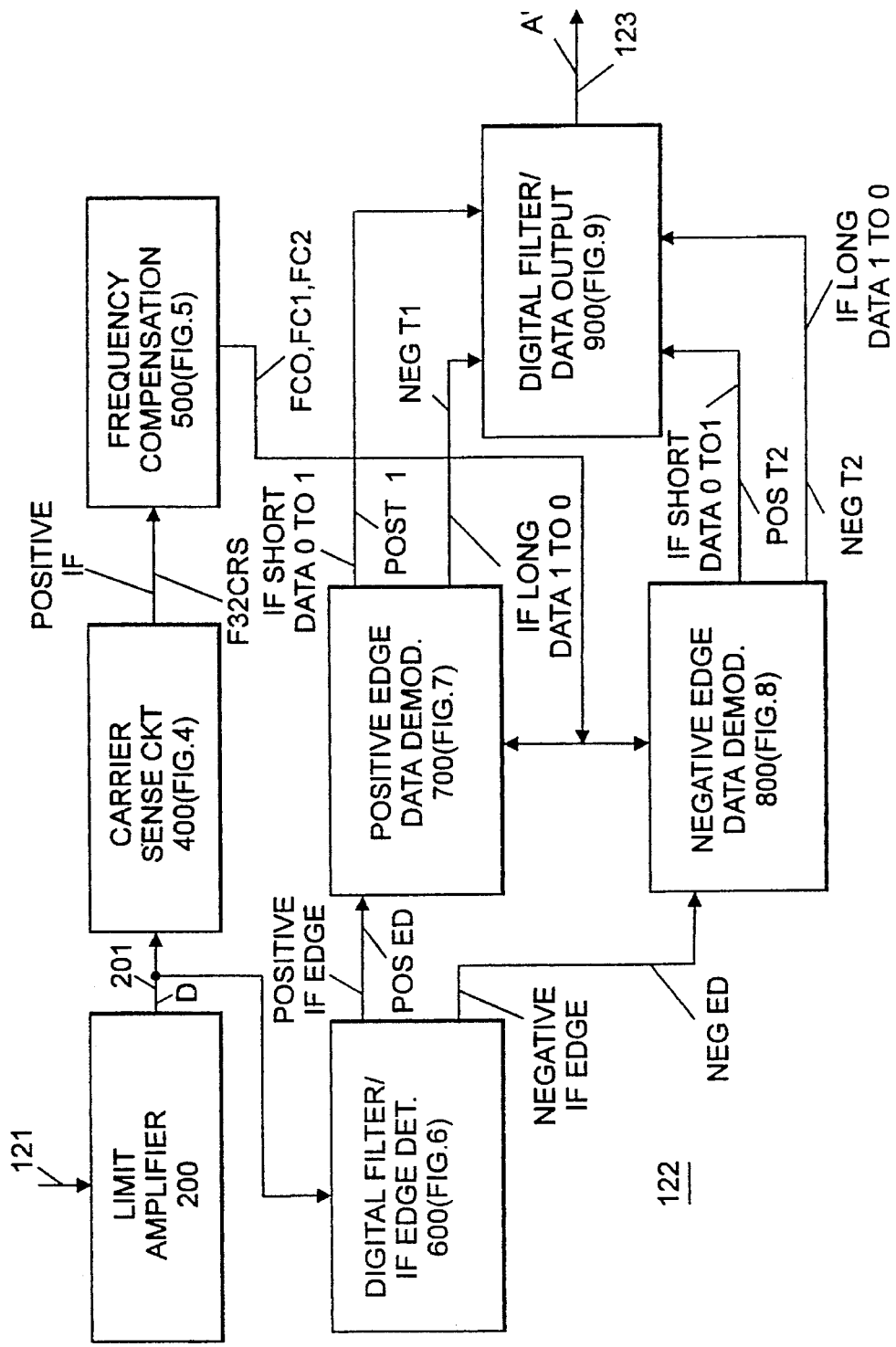
FIG. 3 is a functional block diagram of the demodulator 122 in the receiver, in accordance with the invention.

In FIG. 3, the demodulator 122 has its input 121 connected to the limit amplifier 200, for amplifying the filtered intermediate frequency signal C' to form the square wave, limit amplified signal D shown in FIG. 1A. The square wave signal D will have its zero crossings at the same instant as the zero crossings of the sinewave signal C'. It can be seen by inspection of FIG. 1A, that the duration of each period for the waveform D remains approximately 500 nanoseconds long for normal intervals when there is no phase change applied to the carrier signal B at the transmitter. However, at time T1, when there is a 1-to-0 transition in the data waveform A, there is a corresponding lengthening of the duration of the intermediate frequency signal D to approximately 625 nanoseconds. Further, by inspection it can be seen that at the instant T2 when the data waveform A transitions from a binary 0 to a binary 1, the intermediate frequency waveform D has the duration of its period reduced to approximately 375 nanoseconds. In accordance with the invention, the demodulator circuit 122 of FIG. 3 will detect the occurrence of changes in the duration of the intermediate frequency signal D and will correctly reconstruct the data waveform as the output signal A'. The modulation could be done in the opposite manner, for example, by applying a phase shift delay when the binary input waveform A rises from a 0 value to a 10 and removing the phase shift delay when the binary value transitions from a 1 to a 0, for example.

It is seen that the circuit of FIG. 3 monitors the time intervals between consecutive positive going edges of the D waveform and, in addition, it also monitors the time intervals between consecutive falling edges of the D waveform. In accordance with the invention, this dual monitoring of both the positive going edges of the D waveform and the negative going edges of the D waveform accommodates the asynchronous character between the data waveform A and the intermediate frequency waveform D. For example, if a binary 1-to-0 transition occurred in the data waveform A at an instant close to the transition of the intermediate frequency waveform D, then the modulated character of the waveform might be missed for the PSK measurement of the occurrence of that data transition, however, it would be correctly reflected in the corresponding negative edges of the intermediate frequency waveform. Thus, by monitoring both positive edges and negative edges, it is certain that the asynchronous transitions of the binary waveform A will have their modulated manifestation detectable in the intermediate frequency waveform D.

Figure 4B:
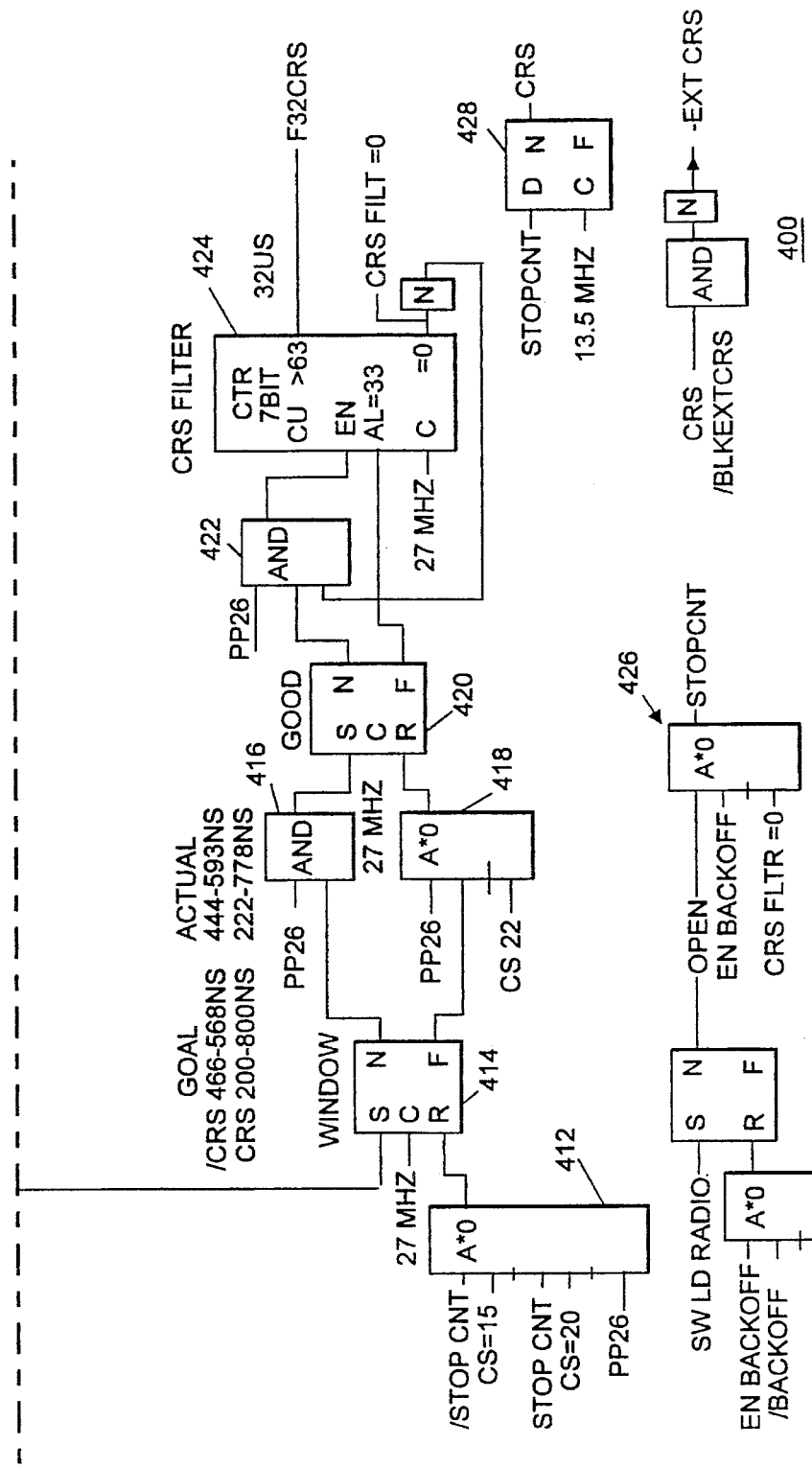
FIG. 4, consisting of FIGS. 4A and 4B is a logic block diagram of the carrier sense circuit, in accordance with the invention.
Figure 4:
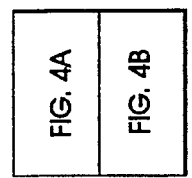
Figure 4A:
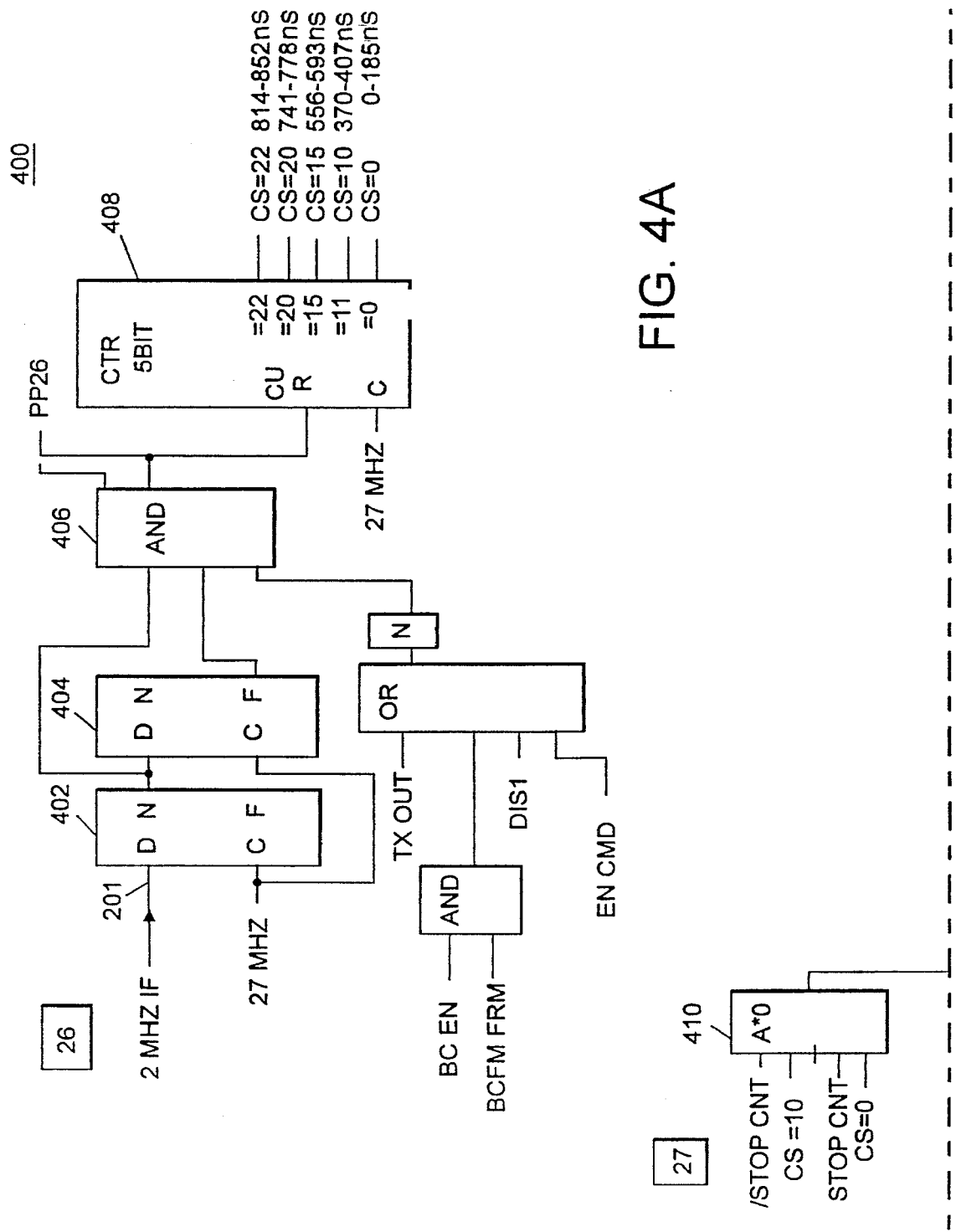

The demodulator circuit 122 of FIG. 3 takes the output D from limit amplifier 200 and applies it to the carrier sense circuit 400 which is shown in greater detail in FIG. 4. The carrier sense circuit 400 correctly detects the presence of the carrier signal bearing a 2 mHz modulated intermediate frequency signal, and outputs a signal F32CRS representing a successful detection of the carrier signal. This is output to the frequency compensation circuit 500 shown in FIG. 5.

Figure 6:
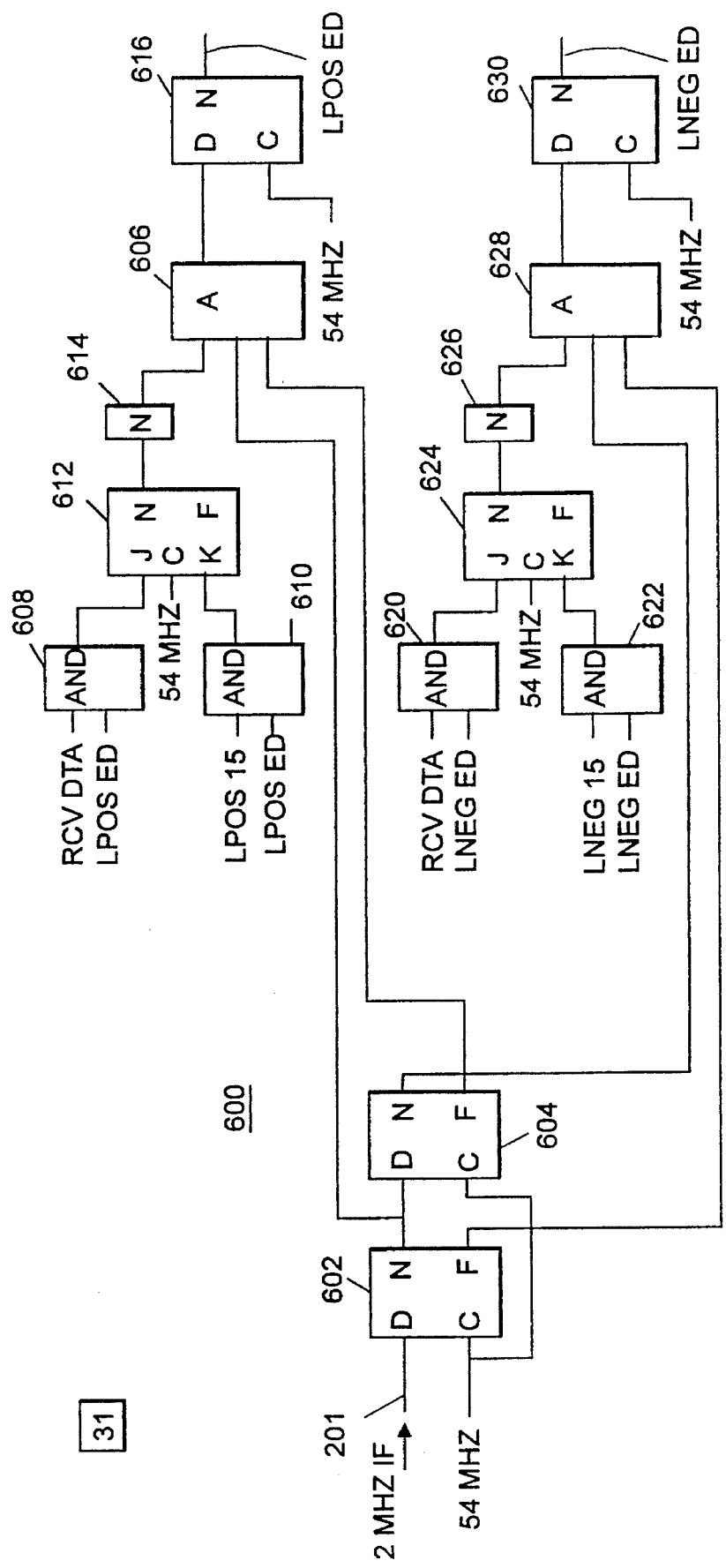
FIG. 6 is a logic block diagram of the digital filter and intermediate frequency edge detector, in accordance with the invention.

The output D from the limit amplifier 200 in FIG. 3 is also applied to the digital filter and intermediate frequency edge detector 600 shown in FIG. 6. The circuit of FIG. 6 correctly detects a positive going edge of the intermediate frequency waveform. This signal is applied as POS ED as the positive edge detection signal to the positive edge data demodulator 700 shown in FIG. 7. The digital filter and intermediate frequency edge detector circuit 600 of FIG. 6 also correctly detects a negative going edge of the intermediate frequency waveform. This recognition is output as the signal NEG ED to the negative edge data demodulator circuit 800 of FIG. 8.

Figure 7:
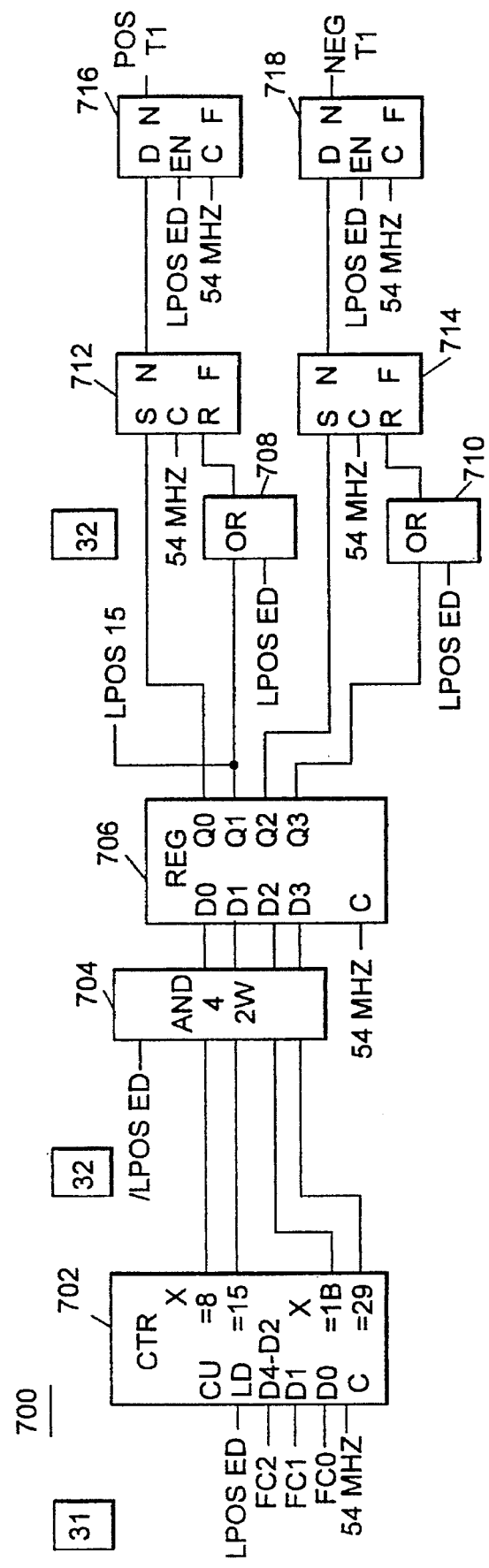
FIG. 7 is a logic block diagram of the positive edge data demodulator circuit, in accordance with the invention.

The positive edge data demodulator circuit 700 of FIG. 7 correctly identifies a short duration interval between consecutive positive edges of the intermediate frequency waveform D, which represents a transition from a binary 0 to a binary 1 for the data waveform A. This information is output as the signal POS T1 to the digital filter and data output circuit 900 of FIG. 9. The positive edge data demodulator circuit 700 of FIG. 7 also correctly detects a long duration interval between consecutive positive intermediate frequency edges for the waveform D, and outputs this recognition as the signal NEG T1 to the digital filter and data output circuit 900 of FIG. 9. The frequency compensation circuit of FIG. 5 outputs signals FC0, FC1, and FC2 to the positive edge data demodulator circuit 700 of FIG. 7, for the purpose of applying a digital offset to the circuit 700 to compensate for changes in the frequency of the nominally 2 mHz frequency for the intermediate frequency signal D.

Figure 8:
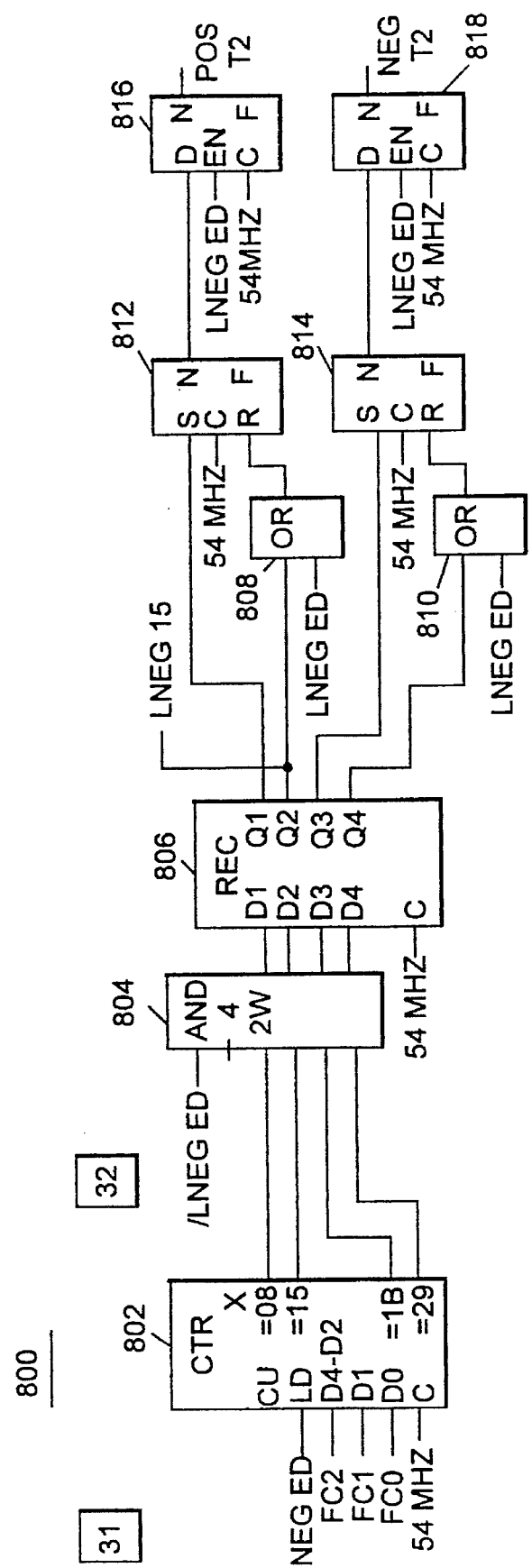
FIG. 8 is a logic block diagram of the negative edge data demodulator circuit, in accordance with the invention.
Figure 9:
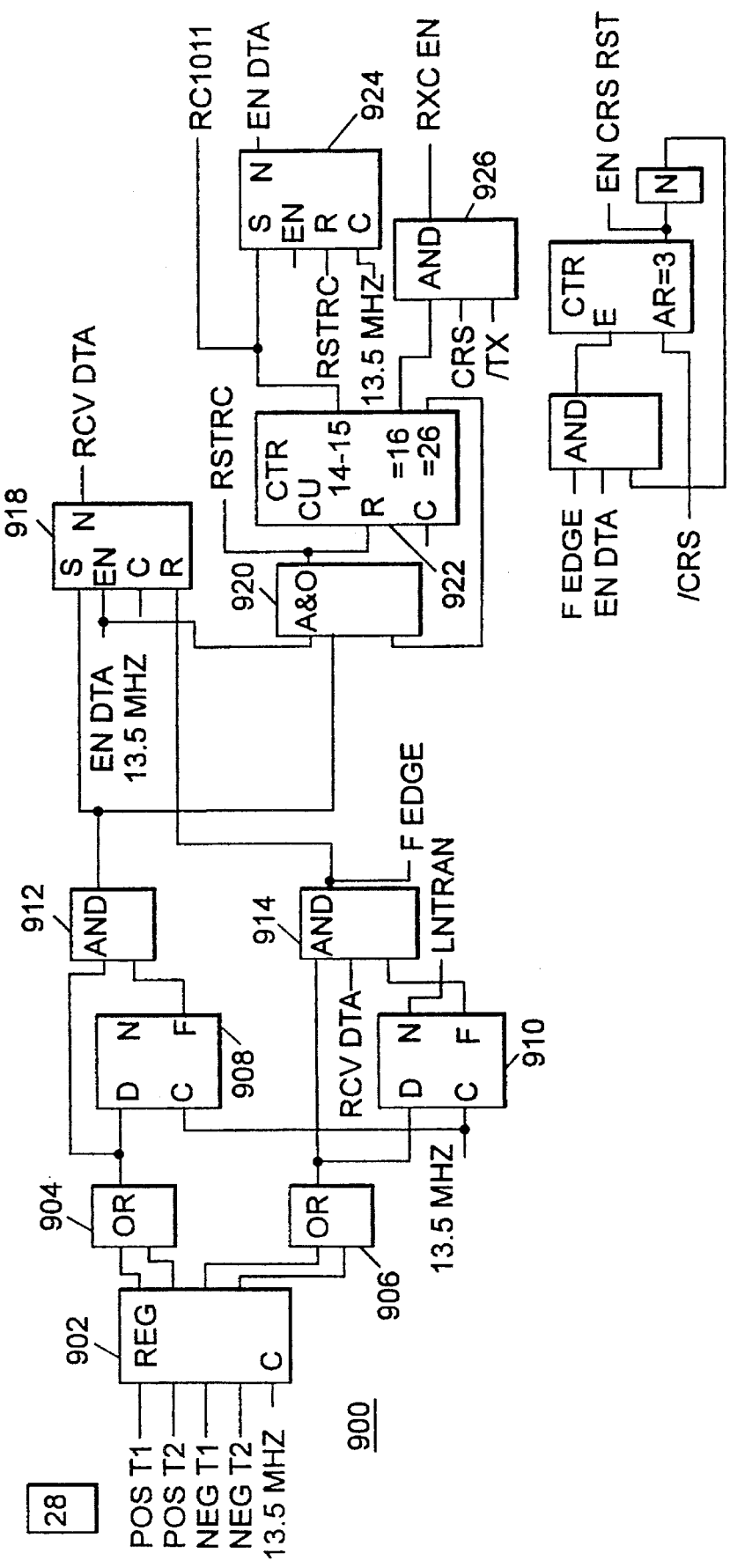
FIG. 9 is a logic block diagram of the digital filter and data output circuit, in accordance with the invention.

The negative edge data demodulator circuit 800 correctly detects the short duration between consecutive negative edges of the intermediate frequency signal D and outputs a recognition signal POS T2 to the digital filter and data output circuit 900 of FIG. 9. The negative edge data demodulator circuit 800 of FIG. 8 also correctly detects the occurrence of long duration intervals between consecutive negative edges of the intermediate frequency signal D, outputting the recognition signal NEG T2 to the digital filter and data output circuit 900 of FIG. 9. The frequency compensation circuit of FIG. 5 outputs the signals FC0, FC1, and FC2 to the negative edge data demodulator circuit 800 of FIG. 8 to apply a digital offset to the circuit 800 to compensate for variations in the nominal 2 mHz frequency of the intermediate frequency signal D.

The digital filter and data output circuit 900 of FIG. 9 correctly outputs the reconstructed binary value A' of the digital data waveform A. The circuit 900 of FIG. 9 applies a digital filter to prevent ringing of the input signal from being misinterpreted as data for the output signal. The reconstructed signal A' is output on line 123 from the demodulator 122 to the local area network interface adapter 124. The digital filtering function performed by the circuit of FIG. 9 monitors binary 0 to binary 1 transitions, and binary 1 to binary 0 transitions of the data waveform A, and blocks the recognition of any further binary data transitions in waveform A for a subsequent 800-nanosecond interval. This is done to prevent spurious ringing signals from confusing the circuitry during the 800-nanosecond interval following a valid data transition in waveform A.

In this manner, the invention successfully accomplishes the detection of the intermediate frequency signal on the 2.4 gHz carrier, it successfully applies frequency compensation to overcome a carrier frequency drift, and it successfully demodulates the intermediate frequency signal to reconstruct the binary digital waveform.

Reference to FIG. 1A will show the intervals between consecutive rising edges of the waveform D, represented as R, and the intervals between consecutive falling edges of the waveform D, represented as F. It can be seen that the intervals between rising edges R are four consecutive periods of 500 nanoseconds for normal intervals, followed by a long interval of 625 nanoseconds at the time T1 when the transition from a binary 1 to a binary 0 occurs for the data waveform A. This is followed by two 500 nanosecond periods which are normal, followed by a short period of 375 nanoseconds, the duration of which is cut short by the occurrence at time T2 of the transition from a binary 0 to a binary 1 for the data waveform A. T2 is then followed by two more normal intervals R of 500 nanoseconds between the rising edges of D. Correspondingly, the falling edge of the waveform D represented by the intervals F in FIG. 1A, shows three consecutive intervals of 500 nanoseconds for the normal intervals, followed by a long interval of 625 nanoseconds which spans the instant of time T1. This is followed by three consecutive normal intervals of 500 nanoseconds and then a short interval of 375 nanoseconds which spans the instant of T2. This is then followed by a normal interval of 500 nanoseconds. The invention is able to identify these normal, long and short intervals for both the rising edge and falling edge of the waveform D, and to correctly infer and reconstruct the data waveform A, as the reconstructed waveform A'.

FIG. 4 is a more detailed illustration of the logic for the carrier sense circuit 400. The 2 mHz intermediate frequency signal D is input on line 201 to the latch 402. The latch 402 is connected to the latch 404. The outputs of the latches 402 and 404 are applied to the AND gate 406 along with the signal TX indicating that there is no transmission currently at the receiving node. The AND gate 406 outputs a signal for every positive edge detected for the input waveform D. The output of AND gate 406 is PP26 and this signal is applied as the reset signal for the counter 408, which counts 27 mHz clock pulses. The counter 408 has five output decodes set to go high after the respective durations that are shown in the figure. The outputs CS=0 and CS=10 are applied to the AND-OR gate 410 and the outputs CS=15 and CS=20 are applied to the AND-OR gate 412. The AND-OR gate 410 has an output connected to the set input of the window latch 414 and the output of the AND-OR gate 412 is applied to the reset input of the window latch 414. The N output of latch 414 is applied to one input of the AND gate 416, the other input being the signal PP26. The F output of the latch 414 is applied as one input to the AND portion of the AND-OR 418, the other input to the AND gate being PP26. The output of the AND is then ORed with the CS=22 output of the counter 408. The CS=22 output for the counter 408 represents an overran condition above a duration of 778 nanoseconds. If no IF cycle has been detected within a duration of approximately 800 nanoseconds, this signal, CS=22, has the effect of resetting the good latch 420 in FIG. 4. The output of the AND gate 416 is applied to the set input of the good latch 420 and the output of the AND-OR gate 418 is applied to the reset input of the latch 420. The latch 420 is clocked with a 27 mHz clock. The N output of the good latch 420 is applied to the AND gate 422, which also has applied to it the signal PP26 and an inverted signal output from the counter 424. The inverted output "=0" from the counter 424 represents the state of the counter not being at 0. The F or off state output of the good latch 420 is applied to the AL=33 input of the counter 424, setting a value of 33 in the counter. The counter then counts the consecutive occurrences of intermediate frequency waveform signals and if it successfully counts above 63 consecutive good IF signals, it applies that recognition as the output signal F32CRS. Once the counter is stopped, it is returned to a 0 state and will not have a value of 33 loaded into it until the good latch 420 goes into its off state. The counter 424 will count all the way up to 127 and then will wrap to 0, or to be more precise, the counter counts from 0 to 127 and then wraps to 0. The counter 424 is the carrier sense filter counter, which is a 7-bit counter which is clocked with 27 mHz clock pulses. The output of the AND gate 422 is applied as the enable signal to the counter 424. The counter 424 counts up from 33 to 64, indicating that if 31 consecutive waveforms for the intermediate frequency signal D, are successfully detected, then it can be inferred that a true carrier signal is being received at the receiving node. This indication is output as a signal F32CRS. This signal is applied to the frequency compensation circuit of FIG. 5. The output F32CRS at a count greater than 63 goes to the frequency compensation circuit 500. For the duration represented by the next 64 IF cycles, from 63 to 127, during that interval the frequency compensation circuit 500 monitors the actual frequency of the IF signal D that is received and generates the values FC0, FC1 and FC2, which are correction factors applied in accordance with the invention to compensate for any deviations from the nominal value of the frequency of 2 mHz. The counter 424 in FIG. 4 will count up to a value of 127 counts, for 95 good IF cycles, and then it will wrap to 0. When it wraps to 0, the "=0" output represents a stop count and that signal is applied to the D input of the latch 428. The latch 428 will then output the CRS signal on output N, representing that a valid carrier sense condition has been detected. The signal CRS is then applied to the LAN interface adapter 124 of FIG. 2, to signal the receiving node to begin looking at the data content of the demodulated output waveform A'.

Figure 5:
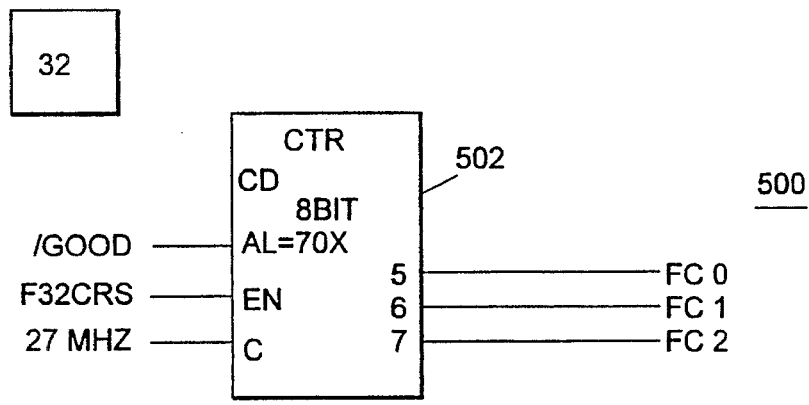
FIG. 5 is a logic block diagram of the frequency compensation circuit, in accordance with the invention.

The frequency compensation circuit 500 of FIG. 5 includes the counter 502, which is an 8-bit counter that counts down. The counter counts the 27 mHz clock pulse and is enabled by the signal F32CRS. The counter 502 counts how long it takes to successfully detect 64 consecutive intermediate frequency cycles of the D waveform. If the intermediate frequency D waveform is exactly 2 mHz in frequency, then the outputs from the counter 502 will be FC0=0, FC1=0, and FC2=0. If it takes a longer time than nominal to count 64 consecutive IF cycles, then the actual frequency of the intermediate frequency waveform D is less than 2 mHz and the values of FC0, FC1 and FC2 will apply a negative offset to the counters 702 and 802 in FIGS. 7 and 8. Conversely, if it takes less than the nominal duration of time to count 64 consecutive IF signals in the counter 502 of FIG. 5, then the values of FC0, FC1 and FC2 will provide a positive offset, reflecting that the actual frequency of the intermediate frequency waveform D is higher than the nominal 2 mHz. This positive offset is then applied to the counter 702 in FIG. 7 and counter 802 in FIG. 8. The counter 502 in FIG. 5 has as one input the not good input and that is the output F from the good latch 420 in FIG. 4. When the not good input is active at the counter 502, the counter has pre-loaded a hex value of 70 hex or a decimal value of 112 into the counter. If the nominal 2 mHz frequency currently exists for the IF waveform D, then the counter 502 will count down for 64 cycles of the IF waveform, and this will take 32 microseconds. This would correspond to 564 counts of the 27 mHz clock applied to the counter 502. Since the counter 502 is an 8-bit counter, it will wrap three times in counting down from the preloaded value of 112 and the resulting value in the 8-bit counter will be a value of 16. Since FC0, FC1 and FC2 are the high order bits of the 8-bit counter, their values will be 0, 0, and 0, respectively, for this condition. Alternately, if the IF frequency is low, then the counter 502 will count more than the nominal 564 counts and as the counter counts down, the next 17 counts of the 27 mHz clock it will wrap. As the counter counts down, the next 17 counts it will wrap and all binary 1's will exist in the 8 bits of the counter. This corresponds to a binary value of −1. Thus, the values of FC0, FC1 and FC2, when they are all 1's, corresponds to a value of −1. This negative value is then applied as a negative offset to the counters 702 in FIG. 7 and 802 in FIG. 8. Alternately, if the IF frequency is higher than the nominal 2 mHz, then the counter 502 will not completely count the 564 counts corresponding to a nominal frequency. There will thus be a corresponding positive binary value for FC0, FC1 and FC2, and this will be applied as a positive offset to the counter 702 in FIG. 7 and the counter 802 in FIG. 8.

FIG. 6 is a detailed logic block diagram of the digital filter and intermediate frequency edge detector circuit 600. The waveform D is input on line 201 to the D input of the latch 602 and the 54 mHz clock pulse is applied to the C input. The N output is connected to the D input of the latch 604 and the 54 mHz clock signal is applied to the C input of the latch 604. The N output of the first latch 602 is applied to one input of the AND gate 606 and the F output of the second latch 604 is applied to the second input of the AND gate 606. When both inputs to the AND gate 606 are high, that indicates that a positive going edge has been detected. The third input to the AND gate 606 is part of the digital filter which avoids the detection of false positive data transitions. If the actual data waveform A is a binary 1, and if another positive edge is detected before 422 nanoseconds, then the circuit ignores a rising edge detection. The AND gate 608 has as one input the signal RCV DTA which is output from the latch 918 in FIG. 9. This signal is the main output of the demodulator 122 and is high when the data waveform A' is high and is 0 when the data output for A' is 0. The other input to the AND gate 608 is LPOS ED which is the output of the latch 616 in FIG. 6. If both of these signals are high, the AND gate 608 sets the latch 612 and the corresponding output from the N terminal of latch 612 is applied through the inverter 614 to a third input of the AND gate 606. This disables the AND gate 606 and prevents a signal being applied to the D input of the output latch 616. This digital filtering operation avoids the recognition of false positive data. Correspondingly, the OR gate 610 has the signal LPOS 15 applied to one input, which comes from the register 706 of FIG. 7. The other input to the OR gate 610 is LPOS ED which is the output of the latch 616 of FIG. 6. The output of the OR gate 610 is applied to the reset of the latch 612.

One aspect of the digital filter and IF edge detector 600 of FIG. 6 is the digital filtering feature which prevents a false detection of a data signal for waveform A. In FIG. 6, the AND gate 608 has as one of its inputs the RCV DTA input which is the reconstructed waveform A' output from the circuit of FIG. 9. When the reconstructed waveform A' has a binary 1 value, it is the object of the digital filter in FIG. 6 to block any indication that a transition from a binary 0 to a binary 1 is taking place with the waveform A. This transition would not take place if them is a valid current binary 1 state for the waveform A and its corresponding reconstructed waveform A'. Thus, once a latched positive signal is output from the latch 616 in FIG. 6, it is applied as one input to the AND gate 608 and the received data signal, which is high, is applied to the other input of the AND gate 608. This sets the S input for the latch 612. The latch 612 is thus set on every positive edge of the IF signal for as long as there is a binary 1 state for the value A' waveform. The output of the latch 612 is inverted through the inverter 614 and applied to one of the three inputs of the AND gate 606. Thus, if the latches 602 and 604 apply positive inputs to the AND gate 606 indicating that a positive edge has been detected for the IF waveform D, the AND gate 606 will only be enabled if the received data value is low. If the received data value is high, then the input to the AND gate 606 is not enabled until the latch 612 is reset. The latch 612 is not reset until the latched positive 15 signal from counter 702 is applied through the OR gate 610 to the reset input of the latch 612. The LPOS 15 signal from the counter 702 does not go high until 422 nanoseconds after the occurrence of the positive edge LPOS ED output from the latch 616. Thus, it is seen that for an interval of 422 nanoseconds following the occurrence of LPOS ED that the LPOS ED output will be disabled. This in effect blocks the recognition of any short interval between consecutive rising edges of the IF waveform D, which would erroneously correspond to an erroneous indication of a rising data waveform signal from A0 to A1. A similar operation takes place for the circuit driving the AND gate 628 into the latch 630 for the negative edge detection circuitry of FIG. 6. Turning to FIG. 1A, the diagram of the IF signal waveform D shows at the beginning of time T1 that the IF waveform is phase delayed by 90°. The design of the receiver 116 includes a low pass filter to minimize overlapping cross-talk from nearby channels. A low pass filter 150 filters the IF output from the mixer 120 before it is applied to the demodulator 122 in FIG. 2. The purpose of the low pass filter is to block out nearby IF channels in a frequency multiplexed application. In particular, where frequency hopping is performed between nearby IF bands, each of which is 1 mHz wide, it is important to eliminate cross-talk from such nearby channels. As a consequence of such low pass filtration, when a 90° phase delay is applied, such as at time T1, if there were no low pass filter the waveform immediately following T1 for waveform D would be relatively flat. However, because of the low pass filter and the elimination of high frequency components in the waveform D, the waveform appears to have a small peak above 0 and a small valley below 0 immediately following the time T1. When the limit amplifier in FIG. 3 is applied to the waveform C', it amplifies the small peak and the small valley in the waveform C' to get a distinct spurious square wave following the time T1. This square wave must be blocked from being interpreted as an indication of a valid transition of either a rising edge or a falling edge for the IF waveform. This is done by the digital filtering circuitry of FIG. 6. Attention is directed to the latch 612 waveform shown in FIG. 1A, which indicates the binary state of the latch 612 in the digital filter of FIG. 6. The latch 612 is seen to stay on in an on state for a period of 422 nanoseconds. The 422 nanosecond duration of the on state for the latch 612 prevents the circuit of FIG. 6 from recognizing the negative edge and following positive edge immediately after T1 as being valid edges for the IF waveform. In this manner, the digital filter compensates for the necessity of applying low pass filtering to the IF waveform to avoid overlapping adjacent channels in a frequency hopping application. Note that after latch 918 falls, as is shown in the waveform of FIG. 1A, latch 612 no longer is set and this is reflected in the waveform for latch 612 also shown in FIG. 1A. Not until the waveform A rises again at time T2 will latch 918 become set and correspondingly latch 612 periodically set to once again apply the digital filtration to the IF waveform to ignore the spurious pulses due to the low pass filtration of the IF waveform.

A similar operation occurs for the negative edge detection portion of the circuit 600 of FIG. 6. AND gate 620 has the signals RCV DTA and LNEG ED.

The output of the AND gate 620 is applied to the set input of the latch 624. The latch is clocked with a 54 mHz clock. The other input to the latch at the reset input is from the OR gate 622 which has the input LNEG 15 which comes from the counter 806 in FIG. 8.

The other input to the OR gate 622 is LNEG ED. The output of the latch 624 is applied through an inverter 626 to one input of the AND gate 628. The F output of latch 602 is applied to a second input of the AND gate 628 and the N output of the latch 604 is applied to the third input of the AND gate 628. The AND gate 628 is enabled whenever a falling edge is detected for the intermediate frequency waveform D. This is output to the D input of the latch 630 which is clocked at 54 mHz and provides the output signal LNEG ED representing the falling edge having been detected. The signal LPOS ED is applied the counter 702 of FIG. 7 for positive edge data demodulation and the signal LNEG ED is applied to the counter 802 of FIG. 8 for negative edge data demodulation.

FIG. 7 shows a logic block diagram for the positive edge detection data demodulation circuit 700. The counter 702 counts up the 54 mHz clock pulses applied to it at input C. The POSED signal representing a positive edge detection for the IF waveform D is applied to the counter and digital offset values FC0, FC1 and FC2 are applied from the frequency compensation circuit of FIG. 5. The counter 702 has four outputs, the first output 8 represents a 200 nanosecond duration, the output 15 represents a 426 nanosecond duration, the output 1B represents a 574 nanosecond duration, and the output 29 represents a 796 nanosecond duration. These decoded signals from the counter 702 are applied through the staging logic 704. The AND gate 704 is for two input AND gates, with one of the inputs being the not positive edge signal and the other input of the AND gate being from each of the respective decoded outputs shown for the counter 702. The output of the AND gate 704 is applied to the input of the staging register 706. The net effect of the AND gate 704 and the staging register 706 is to properly stage the outputs of the counter 702 so that they can be appropriately applied to the following logic circuitry in FIG. 7. Similar comments can be made for the AND gate 804 and staging register 806 of FIG. 8.

The output of the gate 704 is then applied to the register 706 which is clocked at 54 mHz and provides a staging operation for the decoded signal lines output from the counter 702. The decoded signal lines are then output from the register 706 and applied as follows. The 204 nanosecond output decode 8 is applied to the set input of the latch 712. The 426 nanosecond output 15 from counter 702 is applied through the OR gate 708 to the reset input of the latch 712. The other input to the OR gate 708 is the LPOS ED signal. The output of the latch 712 is the window latch and it is applied to the D input of latch 716. The output of latch 716 is POS T1 and represents the detection of a short interval between consecutive positive edges of the waveform D, corresponding to a 0-to-1 transition of the data waveform A. The 1B output which is the 574 nanosecond decode output from counter 702 is applied through register 706 to the set input of the latch 714 and the 796 nanosecond decoded output 29 from the counter 702 is applied through the register 706 and the OR gate 710 to the reset input of the latch 714. The other input to the OR gate is LPOS ED. The output of the latch 714 is applied to the D input of the latch 718 whose output is NEG T1. This signal represents the detection of a long duration between consecutive positive edges of the input waveform D, which corresponds to a 1-to-0 transition for the binary data waveform A. The POS T1 output from latch 716 represents a short duration of between 200–422 nanoseconds. The output NEG T1 from latch 718 represents a long duration of from 568 to 800 nanoseconds. These signals are applied to the digital filter and data output circuit of FIG. 9.

FIG. 8 is organized in a manner similar to that shown for FIG. 7. Counter 802 receives NEG ED signal, the FC0, FC1 and FC2 signals, and counts a 54 mHz clock. It outputs 200, 422, 568 and 800 nanosecond decoded signals which are applied through the logic 804 and the register 806 to the latch 812, the OR gate 808, the latch 814 and the OR gate 810. The output of the latch 812 is applied to the D input of the latch 816, whose output is POS T2 which represents the detection of a short duration between consecutive negative edges of the input waveform D. The output of latch 814 is applied to the D input of the latch 818 which outputs the signal NEG T2. This signal represents detection of a long duration between consecutive negative edges of the input waveform D. A short duration for POS T2 indicates a transition of the data waveform A from binary 0 to binary 1. A long duration represented by NEG T2 represents a binary transition from a binary 1 to a binary 0 for the data A. These signals are applied to the digital filter and data output circuit 900 of FIG. 9.

FIG. 9 shows the register 902 which receives these signals and outputs them through the OR circuit 904 and 906. The latch 908 is connected to the AND gate 912 which is satisfied when a short transition signal is received, of the waveform D. The output of the AND gate 912 sets the output latch 918 for RCV DTA, indicating that a transition from binary 0 to binary 1 has been detected. OR 906 is output to latch 910 and AND gate 914. AND gate 914 is satisfied when a long duration signal is received. The output of the AND gate 914 is to the reset input of the latch 918.

The register 902 in FIG. 9 has the long duration signals NEG T1 and NEG T2 applied through the register 902 and OR gate 906 to the AND gate 914 and the latch 910. When a negative edge is detected, either for the negative edge detector or for the positive edge detector, then the AND gate 914 is satisfied and resets the latch 918. The output RCV DTA then goes from 1 to 0, which reconstructs the binary 1 to binary 0 transition of the data waveform A.

The latch 910 has an output from its N terminal labelled LNTRAN.

The AND gate 912 in FIG. 9 has an output applied to the AND-OR gate 920, which has another output to its AND gate applied from the enable data signal EN DTA. This signal comes from the output latch 924 in FIG. 9, and is used in the digital filter feature of this circuit which prevents ringing signals from being detected. The other input to the OR gate of the gate 920 is a signal 26 output from the counter 922.

The output of the gate 920 is applied to the reset terminal of the counter 922. The counter 922 counts up and counts 13.5 mHz clock pulses. It has a 14–15 output which is applied to the set input of the latch 924.

The latch 924 has a clock input from the 13.5 mHz clock. It has a reset input RSTRC from AND gate 920.

The output of the latch 924 is EN DTA which represents the period following a 1.11 millisecond interval, after which valid signals may be detected.

Figure 10:
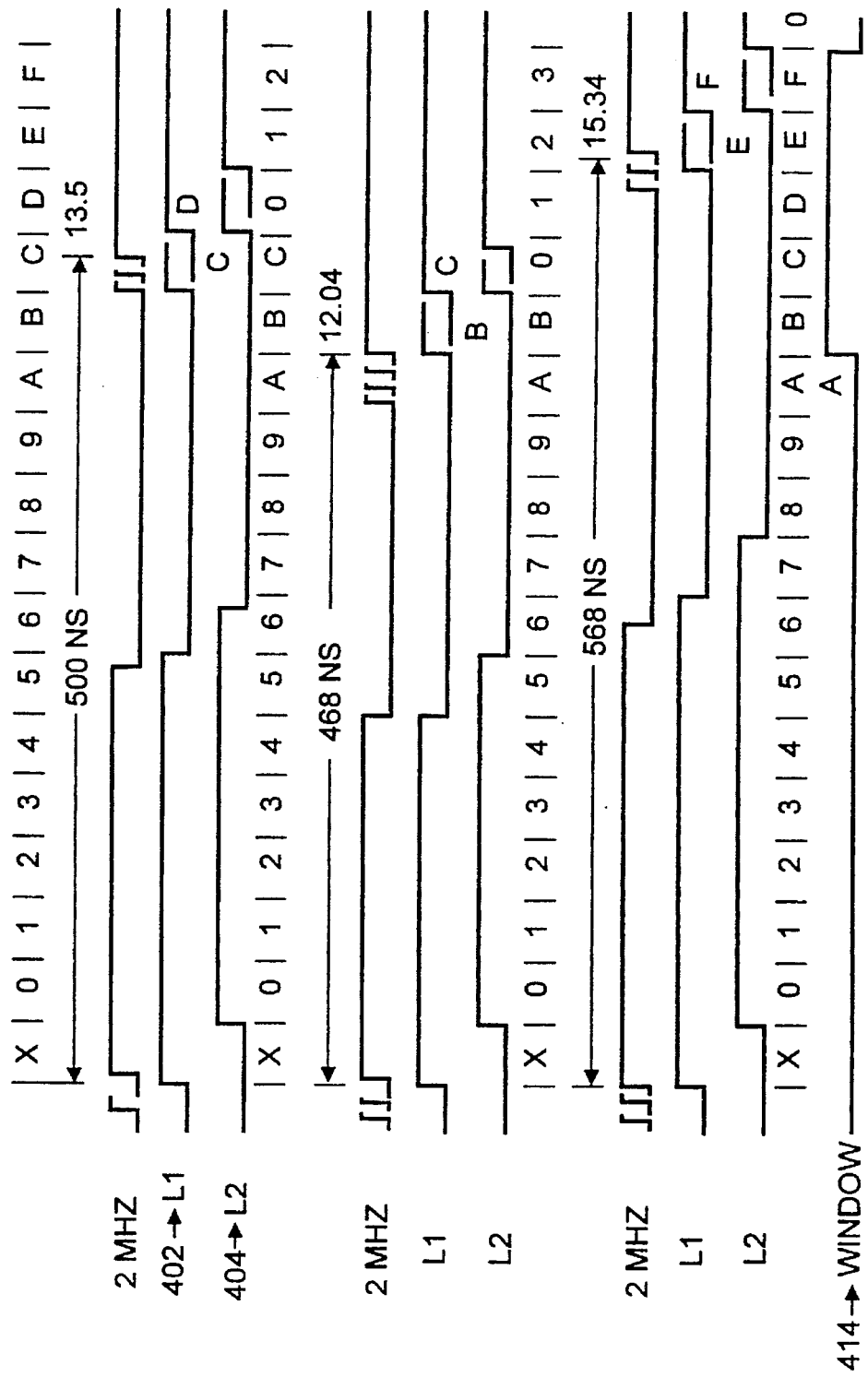
FIG. 10 is a timing diagram of the carrier sense operation.

FIG. 10 is a timing diagram for the carrier sense decode. The window waveform pertains to the window latch 414. In FIG. 10, the L1 waveform corresponds to latch 402 and the L2 waveform corresponds to the latch 404. The window waveform corresponds to the latch 414 in FIG. 4.

Figure 11:
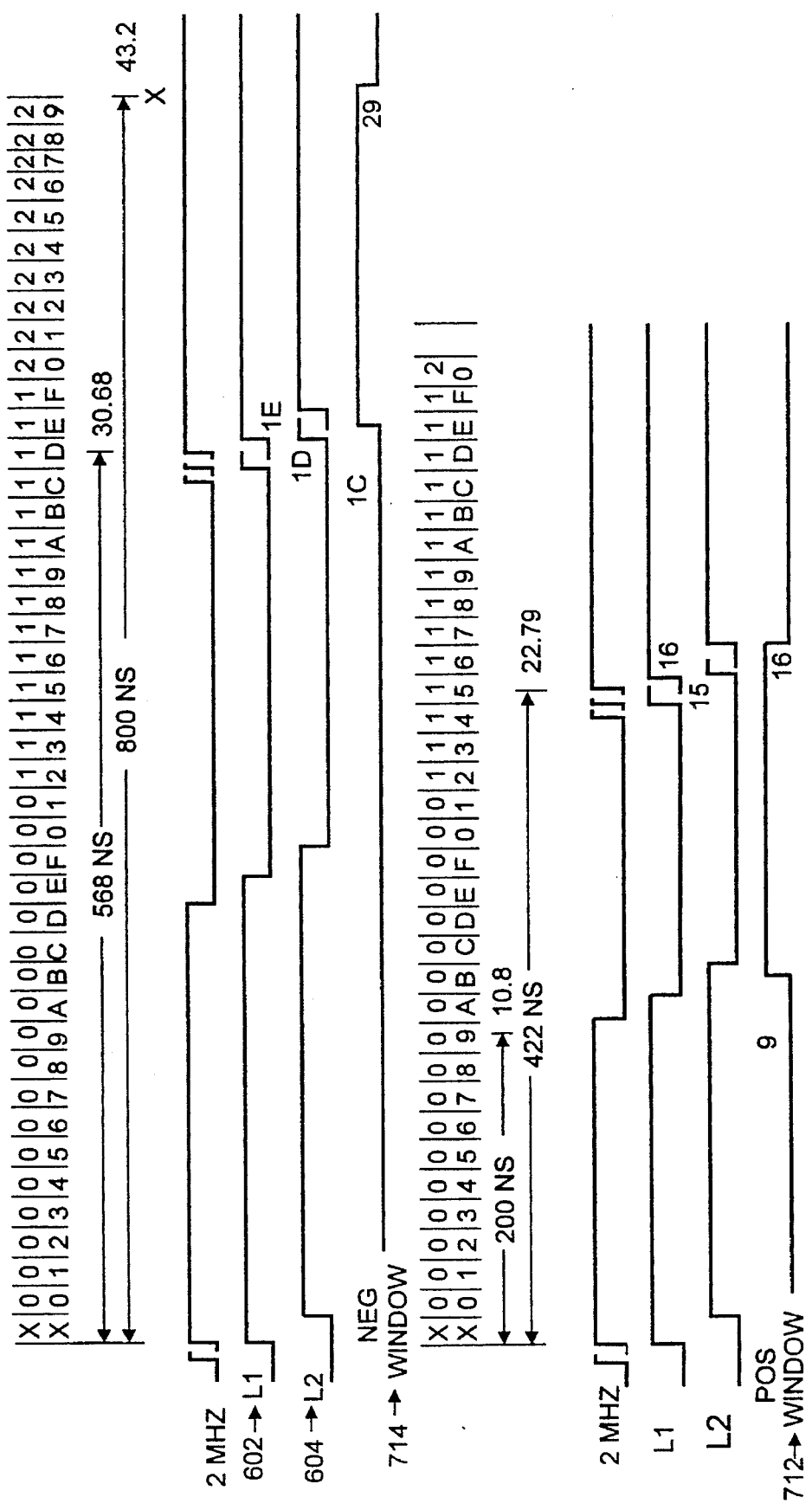
FIG. 11 is a timing diagram of the data demodulation operation of the invention.

FIG. 11 is a timing diagram of the data demodulation. The NEG window waveform pertains to the latch 714. The POS window waveform pertains to the latch 712. In FIG. 11, the L waveform corresponds to the latch 602 and the L2 waveform corresponds to the latch 604 in FIG. 6. The NEG window waveform corresponds to the latch 714 in FIG. 7 and the POS window waveform corresponds to the latch 712 in FIG. 7.

Figure 12:
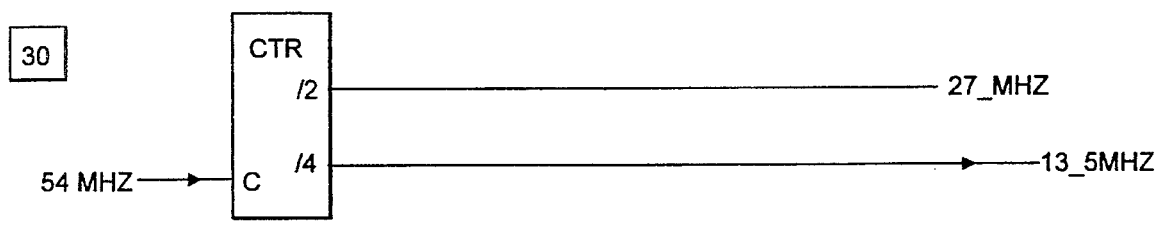
FIG. 12 is a logic block diagram of the clock pulse generation circuit.

FIG. 12 is a logic diagram illustrating how the 54 mHz local clock pulse is counted down to provide 27 mHz and 13.5 mHz clock pulses which are used in the logic circuits.

Table 1 shows the frequency compensation count values for the counter 502 in FIG. 5. The counter 502 counts the 27 mHz clock pulses for 16 consecutive cycles of the IF waveform in order to measure the actual frequency of the IF waveform. Table 1 shows several columns, the first column is the number of 27 mHz clock pulses that have been counted from the beginning of the counting interval for the counter 502. The table goes from 1 count all the way up to 254 counts. This is based upon local crystal oscillators at the transmitter and the receiver, each having a frequency of 2.4 gHz for the transmitter ±50 parts per million and 2.4 gHz+2 mHz±50 parts per million. In the worst case, the transmitting crystal oscillator could have its tolerance in the opposite direction from the crystal oscillator at the receiving node and this would result in their being a ±240 kHz tolerance in the difference between the frequencies for the transmitting oscillator and the receiving oscillator. This then would correspond to a counting range of from 754 clock counts for 64 IF cycles, corresponding to a 27.89 microsecond duration for 64 IF cycles, up to 1009 clock counts for 37.33 microseconds required to count the 64 IF cycles. The first column of Table 1 is the number of counts of the counter, the second column is the initially-set count applied as the AL count in FIG. 5. If the counter were a 10-bit counter, then 880 counts would correspond to the hexadecimal number 370 hex. For an 8-bit counter, the hexadecimal representation is 70 hex. Since the counter 502 is an 8-bit counter, the value of 70 hex is loaded into the counter 502 at the beginning of the counting period. Taking the top three bits in an 8-bit counter as FC0, FC1 and FC2, they would represent a binary value of 3 for a starting count of 880 for the first pulse counted of the 27 mHz clock. The third column of Table 1 shows the hexadecimal value for a 10-bit counter, the fourth column shows the hexadecimal representation in an 8-bit counter. The fifth column the value of the binary representation for FC0, FC1 and FC2 and the sixth column represents the time in nanoseconds which is the duration from the beginning of the clock pulse counting. Table 1 shows the progression of the values for these six columns as the number of 27 mHz clock pulses increases from 1 up through 754. At the level of the 753 counted clock pulse, the remaining count in the counter 502 is 128 and this corresponds to a hexadecimal representation of 80 for both a 10-bit counter and an 8-bit counter. The corresponding binary value for FC0, FC1 and FC2 would be a value of 4 and this would be at the 27852 nanosecond duration since the beginning of the clock counting period. At this point, the IF frequency is 2.295 mHz and this corresponds to a 27889 nanosecond interval since the beginning of the clocking. Table 1 shows some additional columns. The POS window start value and stop value refer to the latches 712 and 812 in FIGS. 7 and 8. The NEG window start and stop values refer to the latches 714 and 814 in FIGS. 7 and 8. Table 1 shows that the binary value for FC0, FC1 and FC2 will slowly decrease from a value of 4 at 27740 nanoseconds or an IF frequency of 2.2989 mHz to 0 at a value of 2.000 mHz. This is the normal or nominal value for the IF frequency. As the IF frequency continues to decrease, at a value of 1.961 mHz, it is seen that the binary value of FC0, FC1 and FC2 goes negative. The negative value continues to negatively increase up to a value of 4 at the lower range for the IF frequency of 1.714 mHz. The values for FC0, FC1 and FC2 are applied as offset values to the counters 702 and 802 in FIGS. 7 and 8, as previously discussed. Thus it is seen that frequency compensation is accurately imposed by the invention.

A problem occurs with carrier detection when the transmitter is stabilizing its frequency at the beginning of a transmission interval. The transmitter will change its transmission frequency each time there is a frequency hopping event in the network. In addition, the frequency of transmission is different from the local oscillator receiving frequency, and therefore every time a note in the local area network changes from the receiving mode to the transmitting mode, the oscillator frequency must stabilize at the transmitting frequency. During the interval of stabilization of the transmitting frequency, any receiver in the network that detects the presence of the carrier signal being transmitted by the transmitter, risks performing a carrier detection on an unstable signal. This problem is solved by the intentional introduction of a spoiler signal at a transmitter during an initial period when the transmitter is attempting to stabilize a new transmission frequency. Thus, during that initial period of attempted stabilization by the transmitter, any receiver detecting the transmitted carrier signal will not have a successful carrier detection operation. It is only after the transmitter has stabilized its signal that the spoiler signal is removed from modulating the carrier from the transmitter so as to permit receivers to successfully detect the stabilized transmitted carrier signal.

Figure 13:
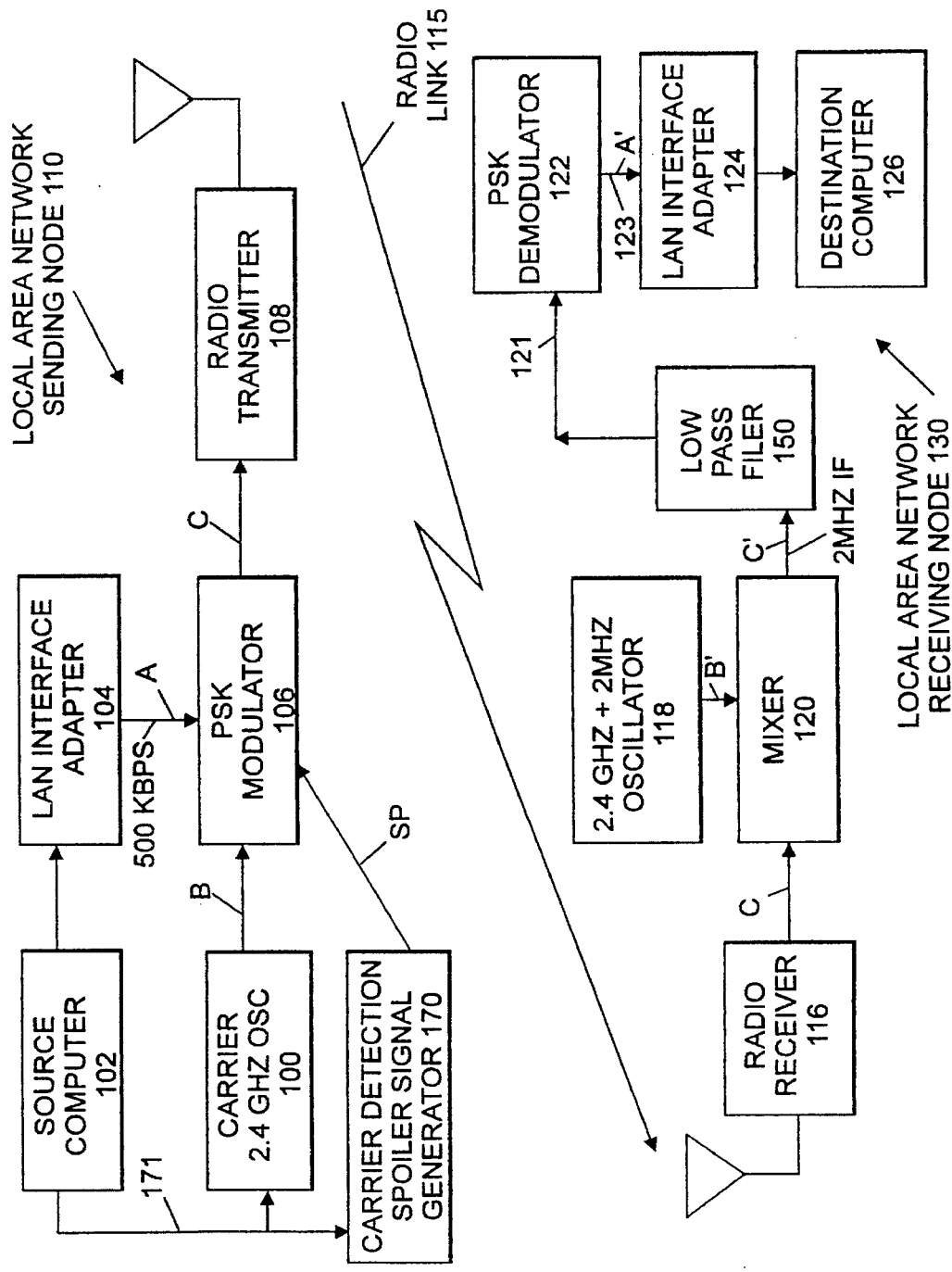
FIG. 13 is a functional block diagram of the local area network, showing the carrier detection spoiler signal generator 170 at the transmitter.

FIG. 13 illustrates the local area network shown in FIG. 2, but with the addition of the carrier detection spoiler signal generator 170 at the transmitter sending node 110. The source computer 102 outputs on line 171 the information as to whether the node is in a transmitting mode or a receiving mode. When the source computer 102 in FIG. 13 begins the transmitting mode, a signal is applied on line 171 to the oscillator 100 to begin stabilizing the attempt to stabilize the new transmitting frequency. The signal 171 is also applied to the carrier detection spoiler signal generator 170, to start the spoiler signal SP which is applied to the modulator 106.

Figure 14:
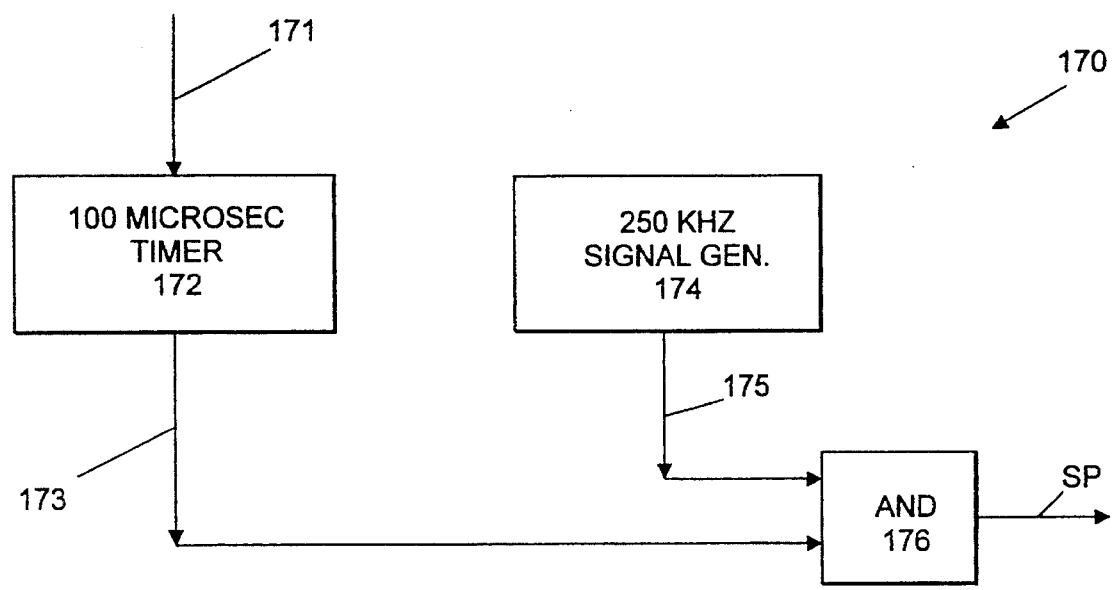
FIG. 14 is a schematic diagram of the carrier detection spoiler signal generator circuit 170.

FIG. 14 shows a more detailed view of the carrier detection spoiler signal generator 170. The start transmission signal 171 is applied to a 100 microsecond timer 172 which turns on the enabling line 173. Also included in the carrier detection spoiler signal generator 170 is a 250 kHz signal generator 174. A 250 Kbps pulse train is output on line 175. Lines 173 and 175 are applied to the AND gate 176, the output of which is the spoiler signal SP. At the instant that the signal on line 171 is applied to the timer 172, the enabling signal 173 is applied to the AND gate 176. For a duration of 100 microseconds, the AND gate 176 is enabled, and passes the 250 KHz pulse train on line 175 out as the spoiler signal SP. The duration of 100 microseconds for the timer 172 was determined from the maximum normal time required for a transmitter oscillator 100 to stabilize at a new transmission frequency. Other values could be chosen for the 100 microsecond timer 172. The 250 kHz signal output on line 175 and passed as the spoiler signal SP to the modulator 106, produces a modulation phase change in the carrier signal C output from the modulator 106. The occurrence of the modulated phase change is once every four IF intermediate frequency intervals which are each 500 nanoseconds long.

Reference to FIG. 15A will show a sequence of the intermediate frequency pulses D which also were shown in FIG. 1A. At the receiver, the mixer 120 mixes the local oscillator 118 signal B' with the received carrier signal C, producing the D waveform. The D waveform shown in FIG. 15A is seen to have a phase modulation occur at every fourth intermediate frequency pulses. As was discussed above, the carrier sensing circuit 400 counts 32 consecutive IF pulses on the waveform D before it outputs the signal F32CRS indicating that a successful detection of the carrier has been made. In accordance with the invention, by intentionally spoiling the carrier signal C through the intentional introduction of a phase change in one out of eight IF pulses on the waveform D, by using the carrier detection spoiler signal generator 170 at the transmitter, the carrier sense circuit 400 at the receiver is not capable of successfully identifying the presence of a carrier. In accordance with the invention, it will not be until 100 microseconds after the beginning of the transmission interval at the transmitter, that the spoiler signal SP will stop modulating the carrier signal being sent to the transmitter to the receiver. Thus, the receiver is prevented from successfully performing a carrier detection operation on the signal transmitted from the transmitter, until 100 microseconds after the transmitter begins its transmission interval, which is sufficient time to enable the transmitter's oscillator 100 to stabilize at the new transmission frequency.

FIG. 15B shows the state of the waveform D after the transmitter has successfully passed its 100 microsecond duration and its transmitting frequency has stabilized. The uniform IF pulses in the waveform D of FIG. 15B will enable the carrier sensing circuit 400 of the receiver to successfully identify the presence of the carrier and output the signal F32CRS, as described above.

Figure 16:
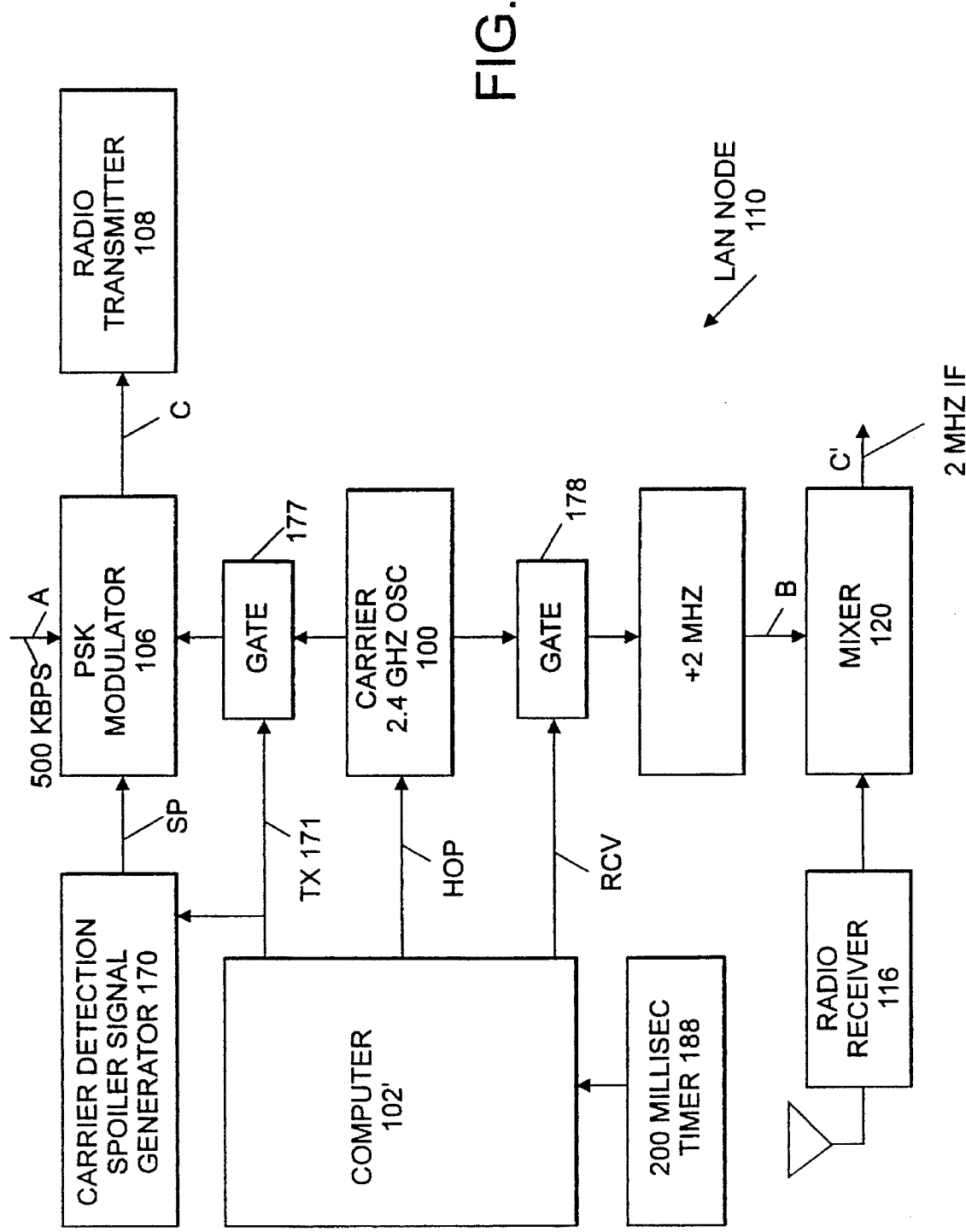
FIG. 16 is a functional block diagram of a complete transmitter/receiver note in the local area network of FIG. 2.

Reference is now made to FIG. 16 which shows a consolidate node in the local area network of FIG. 13, which includes both a transmitter and receiver portion. It is seen in FIG. 16 that a single oscillator 100 is used to generate both the transmission frequency as well as the receiving frequency for the mixer 120. The oscillator frequency from the oscillator 100 is increased by 2 mHz before it is applied to the mixer 120 for receiver operations. A node computer 102' will apply a transmission control signal TX to the gate 177 to apply the 2.4 gHz transmission signal from oscillator 100 to the modulator 106. If the computer 102' is in a receive mode, then it applies a receive control signal RCV to the gate 178 which applies the 2.4 gHz signal plus 2 mHz to the input of the mixer 120.

It is seen in FIG. 16 that the transmit signal TX is applied as a signal on line 171 to the spoiler circuit 170.

FIG. 16 also shows a 200 millisecond timer 188 which serves to identify the frequency hopping interval for the network of FIG. 13. In the network of FIG. 13, each sending node and receiving node will cooperatively change its frequency for transmission and reception every 200 milliseconds, in a operation known as frequency hopping. The 200 millisecond timer 188 notifies the computer 102 prime of each new frequency hopping interval.

Figure 17:
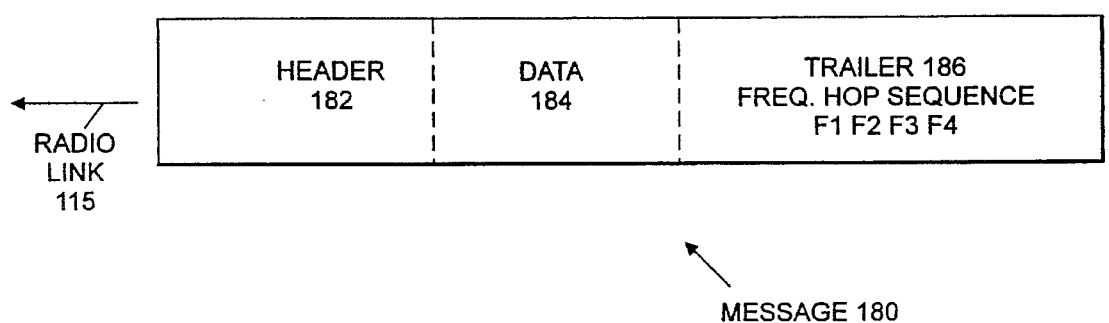
FIG. 17 is an illustration of the message 180 which is transmitted over the radial link 115, and which includes the trailer portion 186 with a specified frequency hopping sequence.

FIG. 17 shows the format of the message 180 which is transmitted over the radio link 115 in the network shown in FIG. 13. The message 180 includes the header portion 182, the data portion 184, and the trailer portion 186. The message 180 trailer portion 186 includes a frequency hopping sequence F1, F2, F3 and F4. The various communicating nodes in the network of FIG. 13 will broadcast to each other every 200 millisecond frequency hopping interval, a new message 180 which identifies the next 4 consecutive frequency hopping frequencies for each of the next 4 frequency hopping intervals 200 milliseconds each.

Each time a transmitter at a communicating node in the network shown in FIG. 13, either changes its status from receiving to transmitting so that the transmitter must stabilize a new transmission frequency, it will undergo the carrier detection spoiler signal generation operation described above. In addition, every time a communicating node performs a frequency hopping transition at the beginning of a new frequency hopping interval, then the transmitter will begin transmitting at a new frequency which requires stabilization, and therefore the transmitter once again, will undergo the carrier detection spoiler signal generation operation described above.

In this manner, receivers in the network of FIG. 13 are prevented from erroneously identifying carrier signals whose frequencies have not yet stabilized.

Table 1 is attached which consists of four pages labeled Table 1(1), Table 1(2), Table 1(3) and Table 1(4).

Although a specific embodiment of the invention has been disclosed, it would be understood by those having skill in the art that changes can be made to that specific embodiment without departing from the spirit and the scope of the invention.

TABLE 1

| | Count 10 Bit | Count 8 Bit | FC 2:0 | Time ns | IF Freq | Pos Window Start | Stop | Neg Window Start | Stop |
|---|---|---|---|---|---|---|---|---|---|
| 1 | 880 | | 370 | 3 | 0.00 | | | | |
| 2 | 879 | 36F | 36F | 5 | 57.04 | | | | |
| 3 | 878 | 36E | 36E | 3 | 74.07 | | | | |
| 4 | 877 | | | | 111.11 | | | | |
| 5 | 876 | | | | 148.15 | | | | |
| 6 | 875 | | | | 185.19 | | | | |
| 7 | 874 | | | | 222.22 | | | | |
| 8 | 873 | | | | 259.26 | | | | |
| 9 | 872 | | | | 296.30 | | | | |
| 10 | 871 | | | | 333.33 | | | | |
| 11 | 870 | | | | 370.37 | | | | |
| 12 | 869 | | | | 407.41 | | | | |
| 13 | 868 | | | | 444.44 | | | | |
| 14 | 867 | | | | 481.48 | | | | |
| 15 | 866 | | | | 518.52 | | | | |
| 16 | 865 | | | | 555.56 | | | | |
| 17 | 864 | | | | 592.59 | | | | |
| 18 | 863 | 35F | 5F | 2 | 629.63 | | | | |
| 19 | 862 | | | | 666.67 | | | | |
| 20 | 861 | | | | 703.70 | | | | |
| 21 | 860 | | | | 740.74 | | | | |
| 22 | 859 | | | | 777.78 | | | | |
| 23 | 858 | | | | 814.81 | | | | |
| 24 | 857 | | | | 851.85 | | | | |
| 25 | 856 | | | | 888.89 | | | | |
| 26 | 855 | | | | 925.93 | | | | |
| 27 | 854 | | | | 962.96 | | | | |
| 28 | 853 | | | | 1000.00 | | | | |
| 29 | 852 | | | | 1057.04 | | | | |
| 30 | 851 | | | | 1074.07 | | | | |
| 31 | 850 | | | | 1111.11 | | | | |
| 32 | 849 | | | | 1148.15 | | | | |
| 33 | 848 | | | | 1185.19 | | | | |
| 34 | 847 | | | | 1222.22 | | | | |
| 35 | 846 | | | | 1259.26 | | | | |
| 36 | 845 | | | | 1296.30 | | | | |
| 37 | 844 | | | | 1333.33 | | | | |
| 38 | 843 | | | | 1370.37 | | | | |
| 39 | 842 | | | | 1407.41 | | | | |
| 40 | 841 | | | | 1444.44 | | | | |
| 41 | 840 | | | | 1481.48 | | | | |
| 42 | 839 | | | | 1518.52 | | | | |
| 43 | 838 | | | | 1559.56 | | | | |
| 44 | 837 | | | | 1592.59 | | | | |
| 45 | 836 | | | | 1629.65 | | | | |
| 46 | 835 | | | | 1666.67 | | | | |
| 47 | 834 | | | | 1703.70 | | | | |
| 48 | 833 | | | | 1740.74 | | | | |
| 49 | 832 | | | | 1777.78 | | | | |
| 50 | 831 | 33F | 3F | 1 | 1814.81 | | | | |
| 54 | 827 | 33B | 3B | 1 | 1962.96 | | | | |
| 58 | 823 | 337 | 37 | 1 | 2111.11 | | | | |
| 62 | 819 | 333 | 33 | 1 | 2259.26 | | | | |
| 66 | 815 | 32F | 2F | 1 | 2407.41 | | | | |
| 70 | 811 | | | | 2555.56 | | | | |
| 74 | 807 | | | | 2703.70 | | | | |
| 78 | 803 | | | | 2851.85 | | | | |
| 82 | 799 | 31F | 1F | 0 | 3000.00 | | | | |
| 86 | 795 | | | | 3148.15 | | | | |
| 90 | 791 | | | | 3296.30 | | | | |
| 94 | 787 | | | | 3444.44 | | | | |
| 98 | 783 | | | | 3592.59 | | | | |
| 102 | 779 | | | | 3740.74 | | | | |
| 106 | 775 | | | | 3888.89 | | | | |
| 110 | 771 | | | | 4037.04 | | | | |
| 114 | 767 | 2FF | FF | 7 | 4185.19 | | | | |
| 118 | 763 | | | | 4333.33 | | | | |
| 122 | 759 | | | | 4481.48 | | | | |
| 126 | 755 | | | | 4629.63 | | | | |
| 130 | 751 | | | | 4777.78 | | | | |
| 134 | 747 | | | | 4925.93 | | | | |
| 138 | 743 | | | | 5074.07 | | | | |
| 142 | 739 | | | | 5222.22 | | | | |
| 146 | 735 | 2DF | DF | 6 | 5370.37 | | | | |

TABLE 1-continued

| Count 10 Bit | Count 8 Bit | FC 2:0 | Time ns | IF Freq | | Pos Window Start | Stop | Neg Window Start | Stop |
|---|---|---|---|---|---|---|---|---|---|
| 150 | 731 | | | 5518.52 | | | | | |
| 154 | 727 | | | 5666.67 | | | | | |
| 158 | 723 | | | 5814.81 | | | | | |
| 162 | 719 | | | 5962.96 | | | | | |
| 166 | 715 | | | 6111.11 | | | | | |
| 170 | 711 | | | 6259.26 | | | | | |
| 174 | 707 | | | 6407.41 | | | | | |
| 178 | 703 | 2BF | BF | 5 | 6555.56 | | | | |
| 182 | 699 | | | 6703.70 | | | | | |
| 186 | 695 | | | 6851.85 | | | | | |
| 190 | 691 | | | 7000.00 | | | | | |
| 194 | 687 | | | 7148.15 | | | | | |
| 198 | 683 | | | 7296.30 | | | | | |
| 202 | 679 | | | 7444.44 | | | | | |
| 206 | 675 | | | 7992.59 | | | | | |
| 210 | 671 | 29F | 9F | 4 | 7740.74 | | | | |
| 214 | 667 | | | 7888.89 | | | | | |
| 218 | 663 | | | 8057.04 | | | | | |
| 222 | 659 | | | 8185.19 | | | | | |
| 226 | 655 | | | 8533.33 | | | | | |
| 230 | 651 | | | 8481.48 | | | | | |
| 234 | 647 | | | 8629.63 | | | | | |
| 238 | 643 | | | 3777.78 | | | | | |
| 242 | 639 | 27F | 7F | 3 | 8925.93 | | | | |
| 258 | 623 | | | 9518.52 | | | | | |
| 274 | 607 | 25F | 5F | 2 | 10111.11 | | | | |
| 290 | 591 | | | 10703.70 | | | | | |
| 306 | 575 | 23F | 3F | 1 | 11296.30 | | | | |
| 322 | 559 | | | 11888.89 | | | | | |
| 338 | 543 | 21F | 1F | 0 | 12481.48 | | | | |
| 354 | 527 | | | 15074.07 | | | | | |
| 370 | 511 | 1FF | FF | 7 | 13666.67 | | | | |
| 386 | 495 | | | 14259.26 | | | | | |
| 402 | 479 | 1DF | DF | 6 | 14851.85 | | | | |
| 418 | 463 | | | 15444.44 | | | | | |
| 434 | 447 | 1BF | BF | 5 | 16037.04 | | | | |
| 450 | 431 | | | 16629.63 | | | | | |
| 466 | 415 | 19F | 9F | 4 | 17222.22 | | | | |
| 482 | 399 | | | 17814.81 | | | | | |
| 498 | 383 | 17F | 7F | 3 | 18407.41 | | | | |
| 514 | 367 | | | 19000.00 | | | | | |
| 530 | 351 | 15F | 5F | 2 | 19592.59 | | | | |
| 546 | 335 | | | 20185.19 | | | | | |
| 562 | 319 | 13F | 3F | 1 | 20777.78 | | | | |
| 578 | 303 | | | 21370.37 | | | | | |
| 594 | 287 | 11F | 1F | 0 | 21962.96 | | | | |
| 610 | 271 | | | 22555.56 | | | | | |
| 626 | 255 | 0FF | FF | 7 | 23148.15 | | | | |
| 642 | 239 | | | 23740.74 | | | | | |
| 658 | 223 | 0DF | DF | 6 | 24333.33 | | | | |
| 674 | 207 | | | 24925.93 | | | | | |
| 690 | 191 | 0BF | BF | 5 | 25518.52 | | | | |
| 706 | 175 | 0AF | AF | 5 | 26111.11 | | | | |
| 722 | 159 | 09F | 9F | 4 | 26703.70 | | | | |
| 726 | 155 | 09B | 9B | 4 | 26851.85 | | | | |
| 730 | 151 | 097 | 97 | 4 | 27000.00 | | | | |
| 734 | 147 | 093 | 93 | 4 | 27148.15 | | | | |
| 738 | 143 | 08F | 8F | 4 | 27296.30 | | | | |
| 742 | 139 | 08B | 8B | 4 | 27444.44 | | | | |
| 746 | 135 | 087 | 87 | 4 | 27592.59 | | | | |
| 750 | 131 | 083 | 83 | 4 | 27740.74 | 2.2921 | | | |
| 754 | 127 | 07F | 7F | 3 | 27888.89 | 2.2948 <- Max | 148 | 370 | 519 | 741 |
| 758 | 123 | 07B | 7B | 3 | 28057.04 | 2.2827 Comp | 148 | 370 | 519 | 741 |
| 762 | 119 | 077 | 77 | 3 | 28185.19 | 2.2707 | 148 | 370 | 519 | 741 |
| 766 | 115 | 073 | 73 | 3 | 28333.33 | 2.2588 | 148 | 370 | 519 | 741 |
| 770 | 111 | 06F | 6F | 3 | 28481.48 | 2.2471 | 148 | 370 | 519 | 741 |
| 774 | 107 | 06B | 6B | 3 | 28629.63 | 2.2354 | 148 | 370 | 519 | 741 |
| 778 | 103 | 067 | 67 | 3 | 28777.78 | 2.2239 | 148 | 570 | 519 | 741 |
| 782 | 99 | 063 | 63 | 3 | 28925.93 | 2.2125 | 148 | 370 | 519 | 741 |
| 786 | 95 | 05F | 5F | 2 | 29074.07 | 2.2013 | 167 | 389 | 537 | 759 |
| 790 | 91 | 05B | 5B | 2 | 29222.22 | 2.1901 | 167 | 389 | 537 | 759 |
| 794 | 87 | 057 | 57 | 2 | 29570.37 | 2.1791 | 167 | 389 | 537 | 759 |
| 798 | 83 | 053 | 53 | 2 | 29518.52 | 2.1681 | 167 | 389 | 537 | 759 |
| 802 | 79 | 04F | 4F | 2 | 29666.67 | 2.1573 | 167 | 389 | 537 | 759 |

TABLE 1-continued

| | Count 10 Bit | Count 8 Bit | FC 2:0 | Time ns | IF Freq | Pos Window Start | Stop | Neg Window Start | Stop |
|---|---|---|---|---|---|---|---|---|---|
| 806 | 75 | 04B | 4B | 2 | 29814.81 | 2.1466 | 167 | 389 | 537 | 759 |
| 810 | 71 | 047 | 47 | 2 | 29962.96 | 2.1360 | 167 | 389 | 537 | 759 |
| 814 | 67 | 043 | 43 | 2 | 30111.11 | 2.1255 | 167 | 389 | 537 | 759 |
| 818 | 63 | 03F | 3F | 1 | 30259.26 | 2.1151 | 185 | 407 | 556 | 778 |
| 822 | 59 | 03B | 3B | 1 | 30407.41 | 2.1048 | 185 | 407 | 556 | 778 |
| 826 | 55 | 037 | 37 | 1 | 30555.56 | 2.0945 | 185 | 407 | 556 | 778 |
| 830 | 51 | 033 | 33 | 1 | 30703.70 | 2.0844 | 185 | 407 | 556 | 778 |
| 834 | 47 | 02F | 2F | 1 | 30851.85 | 2.0744 | 185 | 407 | 556 | 778 |
| 838 | 43 | 02B | 2B | 1 | 31000.00 | 2.0645 | 185 | 407 | 556 | 778 |
| 842 | 39 | 027 | 27 | 1 | 31148.15 | 2.0547 | 185 | 407 | 556 | 778 |
| 846 | 35 | 023 | 23 | 1 | 31296.30 | 2.0450 | 185 | 407 | 556 | 778 |
| 850 | 31 | 01F | 1F | 0 | 31444.44 | 2.0353 | 204 | 426 | 574 | 796 |
| 854 | 27 | 01B | 1B | 0 | 31592.59 | 2.0258 | 204 | 426 | 574 | 796 |
| 858 | 23 | 017 | 17 | 0 | 31740.74 | 2.0163 | 204 | 426 | 574 | 796 |
| 859 | 22 | 016 | 16 | 0 | 31777.78 | 2.0140 | 204 | 426 | 574 | 796 |
| 860 | 21 | 015 | 15 | 0 | 31814.81 | 2.0116 | 204 | 426 | 574 | 796 |
| 861 | 20 | 014 | 14 | 0 | 31851.85 | 2.0095 | 204 | 426 | 574 | 796 |
| 862 | 19 | 013 | 13 | 0 | 31886.89 | 2.0070 | 204 | 426 | 574 | 796 |
| 863 | 18 | 012 | 12 | 0 | 31925.93 | 2.0046 | 204 | 426 | 574 | 796 |
| 864 | 17 | 011 | 11 | 0 | 31962.96 | 2.0023 | 204 | 426 | 574 | 796 |
| 865 | 16 | 010 | 10 | 0 | 32000.00 | 2.0000 < Norm | 204 | 426 | 574 | 796 |
| 866 | 15 | 00F | 0F | 0 | 32037.04 | 1.9977 | 204 | 426 | 574 | 796 |
| 867 | 14 | 00E | 0E | 0 | 32074.07 | 1.9954 | 204 | 426 | 574 | 796 |
| 868 | 13 | 00D | 0D | 0 | 32111.11 | 1.9931 | 204 | 426 | 574 | 796 |
| 869 | 12 | 00C | 0C | 0 | 32148.15 | 1.9908 | 204 | 426 | 574 | 796 |
| 870 | 11 | 00B | 0B | 0 | 32185.19 | 1.9885 | 204 | 426 | 574 | 796 |
| 871 | 10 | 00A | 0A | 0 | 32222.22 | 1.9862 | 204 | 426 | 574 | 796 |
| 872 | 9 | 009 | 09 | 0 | 32259.26 | 1.9839 | 204 | 426 | 574 | 796 |
| 873 | 8 | 008 | 08 | 0 | 32296.30 | 1.9817 | 204 | 426 | 574 | 796 |
| 877 | 4 | 004 | 04 | 0 | 32444.44 | 1.9726 | 204 | 426 | 574 | 796 |
| 881 | 0 | 000 | 00 | 0 | 32592.59 | 1.9636 | 204 | 426 | 574 | 796 |
| 882 | −1 | 3FF | FF | 7 (−1 | 32629.63 | 1.9614 | 222 | 444 | 593 | 815 |
| 886 | −5 | 3FB | FB | 7 (−1 | 32777.78 | 1.9525 | 222 | 444 | 593 | 815 |
| 890 | −9 | 3F7 | F7 | 7 (−1 | 32925.93 | 1.9438 | 222 | 444 | 593 | 815 |
| 894 | −13 | 3F3 | F3 | 7 (−1 | 33074.07 | 1.9351 | 222 | 444 | 593 | 815 |
| 898 | −17 | 3EF | EF | 7 (−1 | 33222.22 | 1.9264 | 222 | 444 | 593 | 815 |
| 902 | −21 | 3EB | EB | 7 (−1 | 33370.37 | 1.9179 | 222 | 444 | 593 | 815 |
| 906 | −25 | 3E7 | E7 | 7 (−1 | 53518.52 | 1.9094 | 222 | 444 | 593 | 815 |
| 910 | −29 | 3E3 | E3 | 7 (−1 | 33666.67 | 1.9010 | 222 | 444 | 593 | 815 |
| 914 | −33 | 3DF | DF | 6 (−2 | 33814.81 | 1.8927 | 241 | 463 | 611 | 833 |
| 918 | −37 | 3DB | DB | 6 (−2 | 33962.96 | 1.8844 | 241 | 463 | 611 | 833 |
| 922 | −41 | 3D7 | D7 | 6 (−2 | 34111.11 | 1.8762 | 241 | 463 | 611 | 833 |
| 926 | −45 | 3D3 | D3 | 6 (−2 | 34259.26 | 1.8681 | 241 | 463 | 611 | 833 |
| 930 | −49 | 3CF | CF | 6 (−2 | 34407.41 | 1.8601 | 241 | 463 | 611 | 833 |
| 934 | −53 | 3CB | CB | 6 (−2 | 34555.56 | 1.8521 | 241 | 463 | 611 | 833 |
| 938 | −57 | 5C7 | C7 | 6 (−2 | 34703.70 | 1.8442 | 241 | 463 | 611 | 833 |
| 942 | −61 | 3C3 | C3 | 6 (−2 | 34851.85 | 1.8565 | 241 | 463 | 611 | 833 |
| 946 | −65 | 3BF | BF | 5 (−3 | 35000.00 | 1.8286 | 259 | 481 | 630 | 852 |
| 950 | −69 | 3BB | BB | 5 (−3 | 35148.15 | 1.8209 | 259 | 481 | 630 | 852 |
| 954 | −73 | 3B7 | B7 | 5 (−3 | 35296.30 | 1.8132 | 299 | 481 | 630 | 852 |
| 958 | −77 | 3B3 | B3 | 5 (−3 | 35444.44 | 1.8056 | 259 | 481 | 650 | 852 |
| 962 | −81 | 3AF | AF | 5 (−3 | 35592.59 | 1.7981 | 259 | 481 | 650 | 892 |
| 966 | −85 | 3AB | AB | 5 (−3 | 35740.74 | 1.7907 | 259 | 481 | 630 | 852 |
| 970 | −89 | 3A7 | A7 | 5 (−3 | 35888.89 | 1.7833 | 259 | 481 | 630 | 852 |
| 974 | −93 | 3A3 | A3 | 5 (−3 | 36037.04 | 1.7760 | 259 | 481 | 630 | 852 |
| 978 | −97 | 39F | 9F | 4 (−4 | 36185.19 | 1.7687 | 278 | 500 | 648 | 870 |
| 982 | −101 | 39B | 9B | 4 (−4 | 36333.33 | 1.7615 | 278 | 500 | 648 | 870 |
| 986 | −105 | 397 | 97 | 4 (−4 | 36481.48 | 1.7543 | 278 | 500 | 648 | 870 |
| 990 | −109 | 393 | 93 | 4 (−4 | 36629.63 | 1.7472 | 278 | 500 | 648 | 870 |
| 994 | −113 | 38F | BF | 4 (−4 | 36777.78 | 1.7432 | 278 | 500 | 648 | 870 |
| 998 | −117 | 38B | 8B | 4 (−4 | 36925.93 | 1.7332 | 278 | 500 | 648 | 870 |
| 1002 | −121 | 387 | 87 | 4 (−4 | 37074.07 | 1.7263 | 278 | 500 | 648 | 870 |
| 1006 | −125 | 383 | 83 | 4 (−4 | 37222.22 | 1.7194 | 27a | 500 | 648 | 870 |
| 1007 | −126 | 382 | 82 | 4 (−4 | 37259.26 | 1.7177 | 278 | 500 | 648 | 870 |
| 1008 | −127 | 381 | 81 | 4 (−4 | 37296.30 | 1.7160 | 278 | 500 | 648 | 870 |
| 1009 | −128 | 380 | 80 | 4 (−4 | 37333.33 | 1.7143 <- Max | 278 | 500 | 648 | 870 |
| 1010 | −129 | 37F | 7f | 3 (3) | 37370.37 | 1.7126 Comp | | | | |

What is claimed is:

1. An improved method to compensate for carrier drift in a digital radio signal, comprising the steps of:

receiving at a radio receiver, a carrier signal having a carrier frequency that is phase shift modulated with a binary signal;

mixing said carrier signal with a local signal having a local oscillator frequency that is different by an intermediate frequency value, forming an intermediate frequency signal;

forming from said intermediate frequency signal an amplified intermediate frequency signal of square wave pulses having rising and falling edges separated by spacings;

measuring the frequency of said carrier signal by counting a predetermined number of said pulses for a measured interval whose duration is determined by counting a first clock count value;

determining in a demodulator at the receiver when the duration of time defining said spacings changes in response to the phase shift modulation;

measuring first intervals between consecutive rising edges of said amplified intermediate frequency signal of square wave pulses, by counting clock pulses for a second selected interval whose duration is determined by a second selected count value;

measuring second intervals between consecutive falling edges of said received signal by counting clock pulses for a third selected interval whose duration is determined by a third selected count value;

compensating for frequency drift in said carrier signal by adjusting said second selected count value and said third selected count value, using said first clock count value; and combining results of said measuring first intervals and measuring second intervals to provide a composite representation of the binary signal at the receiver.

2. An apparatus in a receiving node of a wireless local area network, to compensate for carrier drift in a digital radio signal, comprising:

a radio receiver means, for receiving a carrier signal having a carrier frequency that is phase shift modulated with a binary signal;

a signal mixing means coupled to said receiver means, for mixing said carrier signal with a local signal having a local oscillator frequency that is different by an intermediate frequency value, forming an intermediate frequency signal;

an amplifier means coupled to said signal mixing means, for forming from said intermediate frequency signal an amplified intermediate frequency signal of square wave pulses having rising and falling edges separated by spacings;

carrier sensing means coupled to said amplifier means, for measuring the frequency of said carrier signal by counting a predetermined number of said pulses for a measured interval whose duration is determined by counting a first clock count value;

demodulator means coupled to said amplifier means, for determining when the duration of time defining said spacings changes in response to the phase shift modulation;

said demodulator means measuring first intervals between consecutive rising edges of said amplified intermediate frequency signal of square wave pulses, by counting clock pulses for a second selected interval whose duration is determined by a second selected count value;

said demodulator means measuring second intervals between consecutive falling edges of said received signal by counting clock pulses for a third selected interval whose duration is determined by a third selected count value;

compensating means coupled to said carrier sensing means and to said demodulator means, for compensating for frequency drift in said carrier signal by adjusting said second selected count value and said third selected count value, using said first clock count value; and said demodulator means combining results of said measuring first intervals and measuring second intervals to provide a composite representation of the binary signal at the receiver.

3. A wireless digital network, comprising:

a first computer means at a sending node of a wireless digital network, for preparing a binary signal;

a transmitting means coupled to said first computer means at the sending node, for forming a phase shift modulated carrier signal from said binary signal and transmitting a wireless radio signal representation of said carrier signal;

a receiving means at a receiving node of the wireless digital network, for receiving the wireless radio signal representation of the carrier signal;

an amplifier means, coupled to the receiving means, for forming from said carrier signal a received signal of square wave pulses having rising and falling edges separated by spacings;

carrier sensing means coupled to said amplifier means, for measuring the frequency of said carrier signal by counting a predetermined number of said pulses for a measured interval whose duration is determined by counting a first clock count value;

demodulator means coupled to said amplifier means, for when the duration of time defining said spacings changes in response to the phase shift modulation;

said demodulator means measuring first intervals between consecutive rising edges of said amplified intermediate frequency signal of square wave pulses, by counting clock pulses for a second selected interval whose duration is determined by a second selected count value;

said demodulator means measuring second intervals between consecutive falling edges of said received signal by counting clock pulses for a third selected interval whose duration is determined by a third selected count value;

compensating means coupled to said carrier sensing means and to said demodulator means, for compensating for frequency drift in said carrier signal by adjusting said second selected count value and said third selected count value, using said first clock count value;

said demodulator means combining results of said measuring first intervals and measuring second intervals to provide a composite representation of the binary signal at the receiver; and a second computer means coupled to said demodulator means at the receiving node of the wireless digital network, for processing said binary signal output from said demodulator means.

4. The wireless digital network of claim 3, which further comprises:

a phase shift PSK modulator at said sending node, having an input connected to a source binary signal, for outputting a PSK modulated carrier signal that is delayed by a phase shift when said binary signal changes from a first to a second state, and that is undelayed when said binary signal changes from said second state to said first state, said modulated carrier signal being applied to a radio signal transmitting antenna and transmitted by radio transmission to said receiving node.

5. The wireless digital network of claim 3, which further comprises:

a frequency centering means coupled to said carrier sensing means and to said demodulator, for adjusting a measuring frequency for said clock pulses.

6. A wireless local area network, comprising:

a first processor means at a sending node of a wireless local area network, for preparing a binary signal;

a first bus means at the sending node, coupled to said first processor means, for conducting said binary signal from said first processor means;

a transmitting means coupled to said first bus means at the sending node, for forming a phase shift modulated carrier signal from said binary signal and transmitting a wireless radio signal representation of said carrier signal;

a receiving means at a receiving node of the wireless local area network, for receiving the wireless radio signal representation of the carrier signal;

an amplifier means, coupled to the receiving means, for forming from said carrier signal a received signal of square wave pulses having rising and falling edges separated by spacings;

carrier sensing means coupled to said amplifier means, for measuring the frequency of said carrier signal by counting a predetermined number of said pulses for a measured interval whose duration is determined by counting a first clock count value;

demodulator means coupled to said amplifier means, for determining when the duration of time defining said spacings changes in response to the phase shift modulation;

said demodulator means measuring first intervals between consecutive rising edges of said amplified intermediate frequency signal of square wave pulses, by counting clock pulses for a second selected interval whose duration is determined by a second selected count value;

said demodulator means measuring second intervals between consecutive falling edges of said received signal by counting clock pulses for a third selected interval whose duration is determined by a third selected count value;

compensating means coupled to said carrier sensing means and to said demodulator means, for compensating for frequency drift in said carrier signal by adjusting said second selected count value and said third selected count value, using said first clock count value;

said demodulator means combining results of said measuring first intervals and measuring second intervals to provide a composite representation of the binary signal at the receiver;

a second bus means at the receiving node, coupled to said demodulator means, for conducting said binary signal output from said demodulator means; and a second processor means coupled to said second bus means at the receiving node, for processing said binary signal output from said demodulator means.

7. The wireless local area network of claim 6, which further comprises:

a phase shift PSK modulator at said sending node, having an input connected to a source binary signal, for outputting a PSK modulated carrier signal that is delayed by a phase shift when said binary signal changes from a first to a second state, and that is undelayed when said binary signal changes from said second state to said first state, said modulated carrier signal being applied to a radio signal transmitting antenna and transmitted by radio transmission to said receiving node.

8. The wireless local area network of claim 6, which further comprises:

a frequency centering means coupled to said carrier sensing means and to said demodulator, for adjusting a measuring frequency for said clock pulses.

* * * * *